(12) United States Patent
Hagerott et al.

(10) Patent No.: US 8,725,321 B2
(45) Date of Patent: May 13, 2014

(54) FLIGHT CONTROL SYSTEM

(75) Inventors: Steven G. Hagerott, Wichita, KS (US);
James L. Hammer, Wichita, KS (US);
Philippe A. Ciholas, Sedgwick, KS
(US); Mark W. Palmer, Peru, KS (US)

(73) Assignee: Textron Innovations Inc., Providence, RI (US)

( * ) Notice: Subject to any disclaimer, the term of this patent is extended or adjusted under 35 U.S.C. 154(b) by 545 days.

(21) Appl. No.: 12/708,244

(22) Filed: Feb. 18, 2010

(65) Prior Publication Data
US 2010/0145555 A1 Jun. 10, 2010

Related U.S. Application Data

(63) Continuation-in-part of application No. 11/669,565, filed on Jan. 31, 2007, which is a continuation-in-part of application No. 11/383,791, filed on May 17, 2006.

(51) Int. Cl.
*G05D 1/00* (2006.01)
*G06F 7/00* (2006.01)
*G06F 17/00* (2006.01)
*G05D 1/08* (2006.01)

(52) U.S. Cl.
USPC .............. 701/10; 701/3; 701/4; 701/5; 701/6

(58) Field of Classification Search
None
See application file for complete search history.

(56) References Cited

U.S. PATENT DOCUMENTS

| | | | |
|---|---|---|---|
| 2,277,378 A | 3/1942 | Wells | |
| 2,408,770 A | 10/1946 | Frische et al. | |
| 2,451,263 A | 10/1948 | Webb | |
| 2,590,029 A | 3/1952 | Minorsky | |
| 2,595,192 A | 4/1952 | Garby | |
| 2,620,772 A | 12/1952 | McLane | |
| 2,627,847 A | 2/1953 | Clark et al. | |
| 2,686,896 A | 8/1954 | Mathews | |
| 2,865,337 A | 12/1958 | Dennis et al. | |
| 2,870,745 A | 1/1959 | Kenyon et al. | |
| 2,953,325 A | 9/1960 | Hadekel | |
| 2,971,726 A | 2/1961 | Bratt et al. | |
| 2,991,028 A | 7/1961 | Sedgfield et al. | |
| 3,386,689 A | 6/1968 | Parker et al. | |

(Continued)

FOREIGN PATENT DOCUMENTS

FR    1104903    11/1955

OTHER PUBLICATIONS

Select File History from related U.S. Appl. No. 11/383,791, dated Sep. 5, 2006, through Jan. 21, 2011, 66 pages.

(Continued)

*Primary Examiner* — Khoi Tran
*Assistant Examiner* — Bao Long T Nguyen
(74) *Attorney, Agent, or Firm* — Lathrop & Gage LLP

(57) ABSTRACT

A system and method for controlling an aircraft with flight control surfaces that are controlled both manually and by a computing device is disclosed. The present invention improves overall flight control operation by reducing the mechanical flight control surface components while providing sufficient back-up control capability in the event of either a mechanical or power-related failure. Through the present invention, natural feedback is provided to the operator from the mechanical flight control surface which operates independent of computer-aided flight control surfaces. Further, through the present invention, force input signals received from the pilot are filtered to improve the operation of the computer-aided flight control surfaces.

11 Claims, 16 Drawing Sheets

(56) References Cited

U.S. PATENT DOCUMENTS

| | | | |
|---|---|---|---|
| 3,489,379 A | | 1/1970 | Bogart |
| 3,528,633 A | | 9/1970 | Knemeyer |
| 3,578,270 A | | 5/1971 | Ellis |
| 3,592,418 A | | 7/1971 | Wood |
| 3,750,985 A | | 8/1973 | Wheldon |
| 3,753,350 A | | 8/1973 | Nott |
| 4,017,045 A | | 4/1977 | Kirchhein |
| 4,171,113 A | * | 10/1979 | Townsend ............. 244/221 |
| 4,236,685 A | | 12/1980 | Kissel |
| 4,313,165 A | | 1/1982 | Clelford et al. |
| 4,382,281 A | | 5/1983 | Fowler et al. |
| 4,472,780 A | | 9/1984 | Chenoweth et al. |
| 4,477,044 A | | 10/1984 | Darcy et al. |
| 4,595,158 A | * | 6/1986 | Robinson ............. 244/99.14 |
| 4,759,515 A | | 7/1988 | Carl |
| 4,762,294 A | | 8/1988 | Carl |
| 4,793,576 A | | 12/1988 | Frerk |
| 4,924,401 A | | 5/1990 | Bice et al. |
| 4,964,599 A | | 10/1990 | Farineau |
| 5,082,208 A | | 1/1992 | Matich |
| 5,209,661 A | | 5/1993 | Hildreth et al. |
| 5,238,207 A | | 8/1993 | Wallace et al. |
| 5,428,543 A | | 6/1995 | Gold et al. |
| 5,489,830 A | | 2/1996 | Fernandez |
| 5,735,490 A | | 4/1998 | Berthet et al. |
| 5,791,596 A | * | 8/1998 | Gautier et al. ............. 244/76 R |
| 5,797,564 A | | 8/1998 | Cartmell et al. |
| 5,806,806 A | * | 9/1998 | Boehringer et al. ......... 244/196 |
| 5,868,359 A | | 2/1999 | Cartmell et al. |
| 5,908,177 A | | 6/1999 | Tanaka |
| 6,000,662 A | | 12/1999 | Todeschi et al. |
| 6,241,182 B1 | | 6/2001 | Durandeau et al. |
| 6,269,733 B1 | * | 8/2001 | Reust ............. 91/415 |
| 6,325,331 B1 | * | 12/2001 | McKeown ............. 244/76 A |
| 6,386,485 B1 | * | 5/2002 | Sjoquist ............. 244/194 |
| 6,459,228 B1 | * | 10/2002 | Szulyk et al. ............. 318/632 |
| 6,622,973 B2 | | 9/2003 | Al-Garni et al. |
| 6,695,264 B2 | | 2/2004 | Schaeffer et al. |
| 6,827,311 B2 | * | 12/2004 | Wingett et al. ............. 244/99.5 |
| 6,885,917 B2 | | 4/2005 | Osder et al. |
| 6,913,226 B2 | * | 7/2005 | Huynh ............. 244/75.1 |
| 6,923,405 B2 | * | 8/2005 | Cline et al. ............. 244/99.4 |
| 7,007,897 B2 | * | 3/2006 | Wingett et al. ............. 244/227 |
| 8,050,780 B2 | * | 11/2011 | Tessier et al. ............. 700/63 |
| 2005/0080495 A1 | | 4/2005 | Tessier et al. |
| 2008/0099629 A1 | | 5/2008 | Abel et al. |

OTHER PUBLICATIONS

Select File History from related U.S. Appl. No. 11/669,565, dated Jun. 29, 2010 through Nov. 26, 2010, 26 pages.

Office Action issued in U.S. Appl. No. 11/383,791, dated Mar. 2, 2012, 11 pages.

Response to Office Action filed in related U.S. Appl. No. 11/383,791 dated Jul. 2, 2012, 22 pages.

Notice of Allowance issued in related U.S. Appl. No. 11/383,791 dated Nov. 14, 2012, 12 pages.

Notice of Allowance issued in related U.S. Appl. No. 11/669,565 dated Nov. 7, 2012, 9 pages.

* cited by examiner

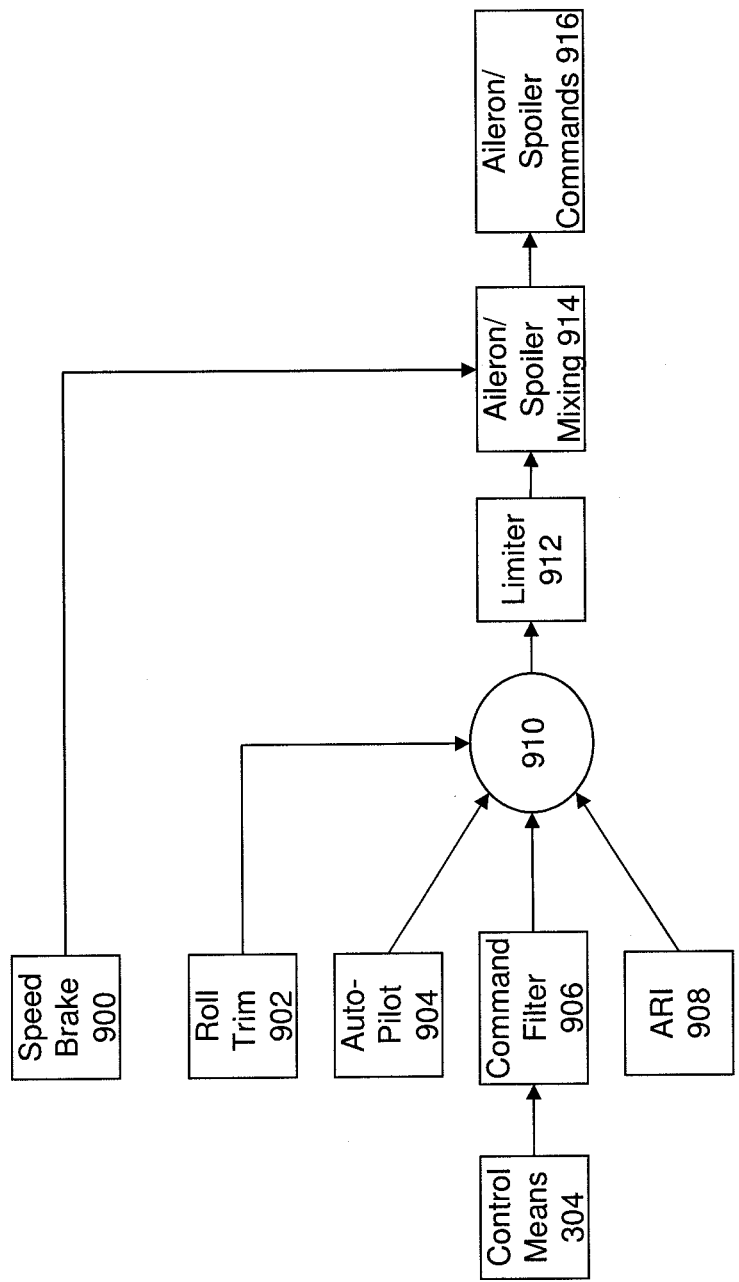

FLIGHT CONTROL SYSTEM

CROSS-REFERENCE TO RELATED APPLICATIONS

This application is a continuation in part of and claims the benefit of U.S. patent application Ser. No. 11/669,565 filed Jan. 31, 2007, which is a continuation in part of and claims the benefit of U.S. patent application Ser. No. 11/383,791 filed May 17, 2006, the disclosures of which are incorporated herein by reference.

BACKGROUND OF THE INVENTION

1. Field of the Invention

The invention relates generally to methods of controlling an aircraft in flight. More specifically, the invention relates to the field of manipulating control surfaces on an aircraft, e.g., ailerons, flaps to aerodynamically control flight characteristics.

2. Description of the Related Art

Aircraft are typically controlled by moveable aerodynamic surfaces on the wing and tail for controlling the altitude and attitude of the aircraft in flight, including roll, pitch, and yaw. Small aircraft can use simple mechanical linkages to transmit the operator's control inputs to these surfaces. Larger and faster aircraft need power assisted or fully-powered control systems. Most powered control systems use mechanical linkages to command the surface actuators, but "fly-by-wire" and "fly-by-light" are becoming more common. In these systems, the mechanical linkage is replaced by a computerized command and feedback loop.

While manually operated control systems provide a direct and reliable link between the operator's input and the movement of the aircraft control surfaces, these mechanical systems tend to have a poor failure tolerance, and as such, require redundant and independent load paths for continued safe flight and landing, in the event of a failure. As a result, additional hardware and mechanisms are required to provide this redundancy.

With a manual system, the work available at the control surface is limited by the force and travel that an operator can apply to the cockpit controls. As the speed and size of aircraft increase, manual control of the aircraft becomes inadequate to effectively maneuver the aircraft. Various means, including servo tabs and fully powered systems, have been employed to provide the additional force necessary to move the control surfaces. However, these systems add complexity and additional failure modes. For example, fully powered systems are dependent on their power sources, which themselves must be highly redundant. Failure of a fully powered system, without having a manual reversion or back-up, would result in complete failure, and lack of control, of any aircraft control surface. Furthermore, fully powered systems do not provide natural force feedback to the operator.

The evolution of aircraft design and technology have resulted in a class of aircraft, such as many larger business class jets, that cannot be completely controlled manually and require power-aided controls and would benefit from computer-aided controls. However, fully powered and completely computerized controls, such as fly-by-wire, are not warranted.

SUMMARY

The present invention is defined by the claims below. Embodiments of the present invention solve at least the above problems by providing a system and method for controlling aircraft flight control surfaces both manually and through a computing device. The system improves overall flight control operation by reducing the manual flight control surface requirements, supplementing those controls with powered controls, and providing sufficient back-up controls in the event of failures.

In one embodiment, the system of the present invention includes a control surface having first and second portions. The first portion is controlled using a substantially mechanical arrangement. The second portion is electronically angularly controlled.

The mechanical arrangement used to control the first portion, in one embodiment, includes a mechanical linkage which receives mechanical input from a user in a cockpit of the aircraft. The translation may be accomplished using a mechanism in the cockpit of the aircraft. The mechanism may utilize foot control and hand control. A force sensor which is adapted to measure the force applied by the operator to the control mechanism may be included on the mechanism. This force sensor creates signals in response to operator effort and is transmitted to a computing device which then operates an electronically controlled actuator for the purpose of controllably positioning the second portion at angular orientations which are substantially the same as those of the first portion.

In embodiments of the system, the computing device may filter and otherwise process the force signal input by the pilot before operating the electronically controlled actuators. Such pilot force input command filters may model the characteristics of the mechanical control arrangement, and its linkages, actuators and control surfaces, or other forces that impact the operation of the control system such as aerodynamic forces. Processing the force signal with filters produce movements of the electronically controlled actuators that are similar to the movements of the mechanical actuators, thus providing more predictable and stable control for the operator of the system. The filters may model any internal or external force that affects the mechanical control system, including, but not limited to friction, damping, inertia and stiffness in the mechanical arrangement utilized to control the first portion of the control surfaces.

The control surface may be a flap, rudder, elevator, aileron, or other like surface on an aircraft.

The control surface may also include a third portion. This third portion would also be electronically controlled in response to the signals and also operate at substantially the same angular orientations as the first and second portions.

An associated method of operating a control surface on an aircraft is also disclosed. This method includes comprising the control surface such that it has first and second portions. The method also may include: (i) providing a device which receives inputs from a user via a mechanical system and angularly displaces the first portion and (ii) electronically controlling the second portion to angularly displace the second portion at angular orientations substantially equal or proportional to those of the first portion. This process might involve using a sensor on the mechanical system and a computer to accomplish the electronic controls for the second portion. Further, the method could involve locating the sensor on a control stick and then measuring operator effort or force using the sensor. Further, the method may involve processing the force signal produced by the force sensor by filtering and otherwise modifying the force signal based on characteristics of the mechanical control arrangement.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 9 is a flow diagram depicting an embodiment of the process of the pilot force input command filter in a roll control law.

DETAILED DESCRIPTION

Embodiments of the present invention provide systems and a method for providing aircraft flight control having natural feedback to an operator while providing the operator with increased performance benefits of a computerized control system. Utilizing a computer-controlled flight control system, in combination with a manual system having natural feedback provides excellent fault tolerance because of the continuous independent parallel systems. The term "computer" should be understood to include any type of device having memory and processing capability, and is not meant to be limited to any particular type of computing device. Should one portion of the system fail, the alternate control paths provide sufficient control authority for continued safe flight and landing. Furthermore, utilizing a flight control system having a portion of the flight control surface being controlled by a computing device reduces the quantity of mechanical linkages that can be prone to fatigue, wear, and possible failure. Controlling a portion of the flight surfaces manually allows an operator to receive direct natural feedback through the mechanical linkage, giving the pilot direct "feel" for what is occurring aerodynamically to the aircraft.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware.

Figure 1:
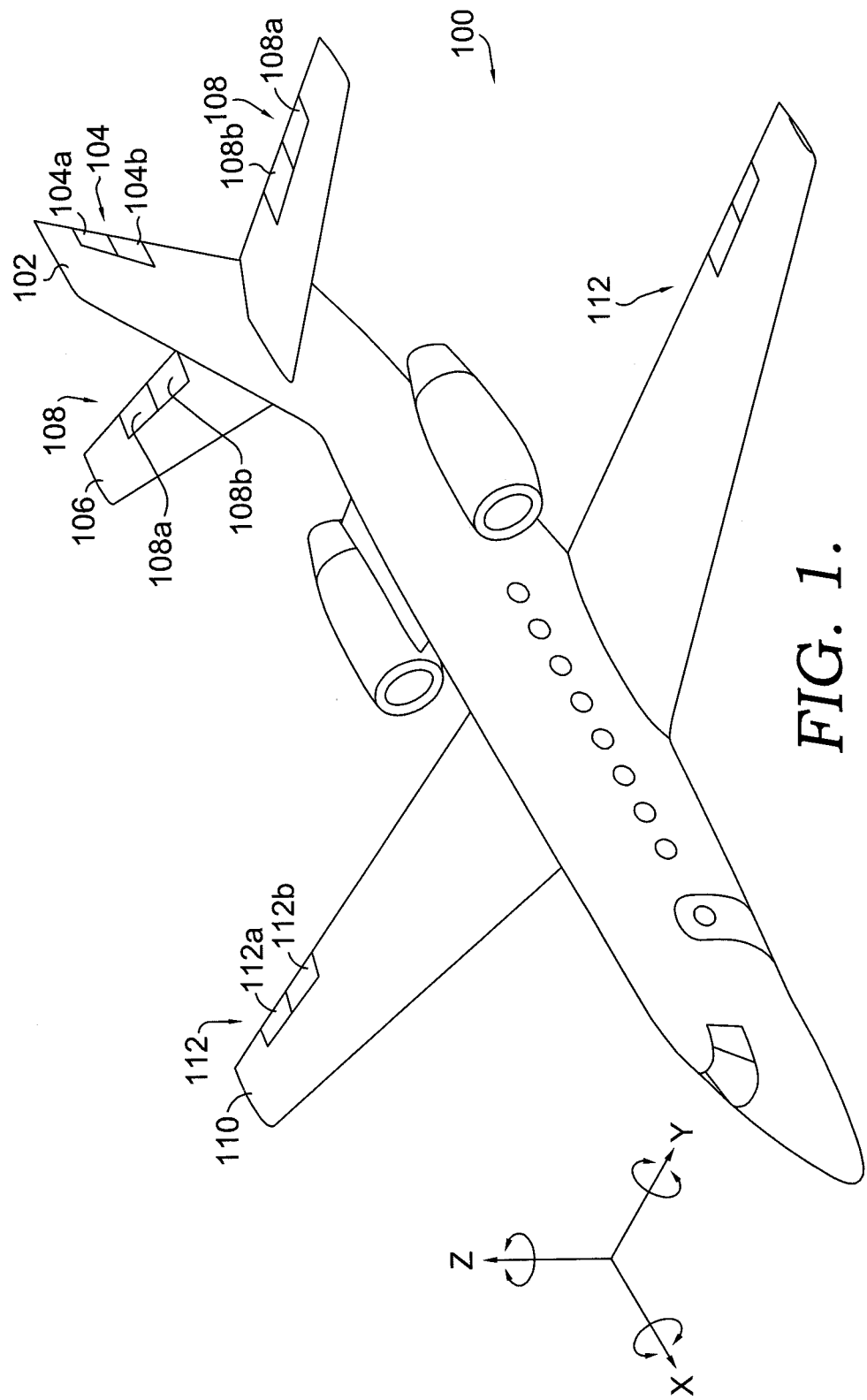
FIG. 1 is a perspective view of the control surfaces of an aircraft.

As aircraft increase in gross weight and airspeed, it becomes more difficult for an operator to manually control the aircraft through the entire flight envelope, such that in order to perform as desired, the use of power assisted control surfaces becomes desirable, and often necessary. Referring now to FIG. 1, an aircraft exhibiting these characteristics and therefore utilizing the present invention is shown in a perspective view. For discussion purposes, one example is a larger executive business jet.

The present invention is applicable to a variety of control surfaces, and FIG. 1 shows one possible configuration of the present invention as applied to control surfaces such as flaps/rudders, elevators, and ailerons. For example, aircraft 100 has a vertical stabilizer 102 having a rudder, or control surface, 104. For the embodiment shown in FIG. 1, rudder 104 has two independent segments, 104a and 104b. While each of these segments move independently for controlling the yaw of the aircraft, or movement about the z-axis, their combined effects produce the desired yaw response for a given operator's input command.

Figure 2:
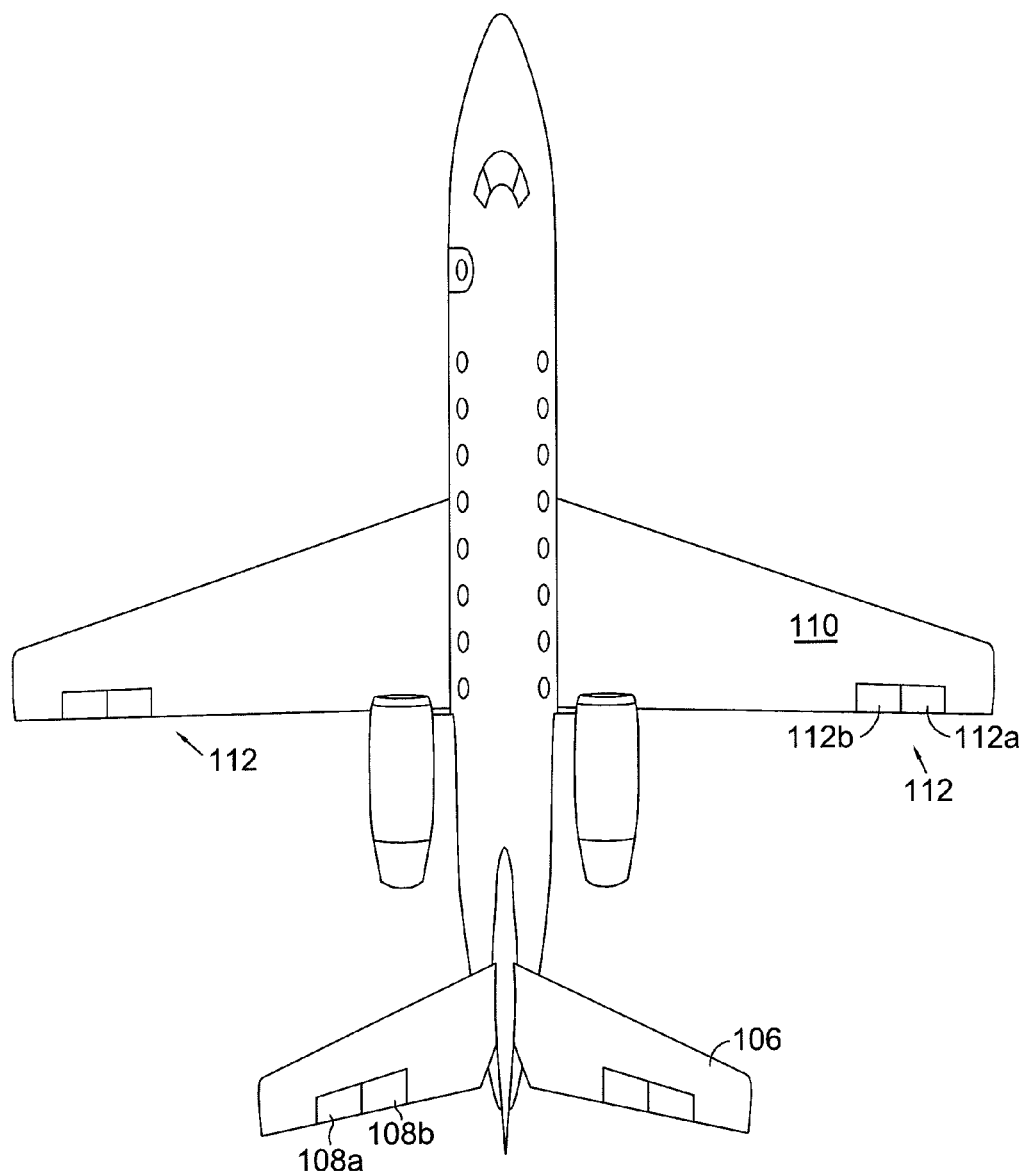
FIG. 2 is a top elevation view of the aircraft of FIG. 1.

Aircraft 100 also includes a horizontal stabilizer 106 having a plurality of control surfaces 108. For the embodiment shown in FIGS. 1 and 2, each control surface 108 has individual segments 108a and 108b. While each of these segments move independently for controlling the pitch of the aircraft, or movement about the Y-axis, their combined effects produce the desired response for a given operator's input command.

Aircraft 100 also has a wing 110 having ailerons 112. The ailerons 112 each have a plurality of individual segments 112a and 112b and can each move up and down, such that they move in opposition to the ailerons on the opposite wing. The ailerons are utilized for controlling the roll rate of the aircraft, or motion about the x-axis of the aircraft. For example, raising the ailerons on the right wing, causes air passing over the wing to push on the ailerons, and push the right wing down, and lowering ailerons on the left wing causes air passing underneath the wing to push on the ailerons to raise the left wing. The result of such a control surface movement is the aircraft rolling to the right. To roll the aircraft to the left, the opposite aileron position is required. While ailerons 112a and 112b move independently for controlling the roll rate of the aircraft, their combined effects produce the desired roll response for a given operator's input command. Spoilers and speedbrakes are also common and can be combined with ailerons for additional roll control and can be directly used for lift and drag control.

Figure 3A:
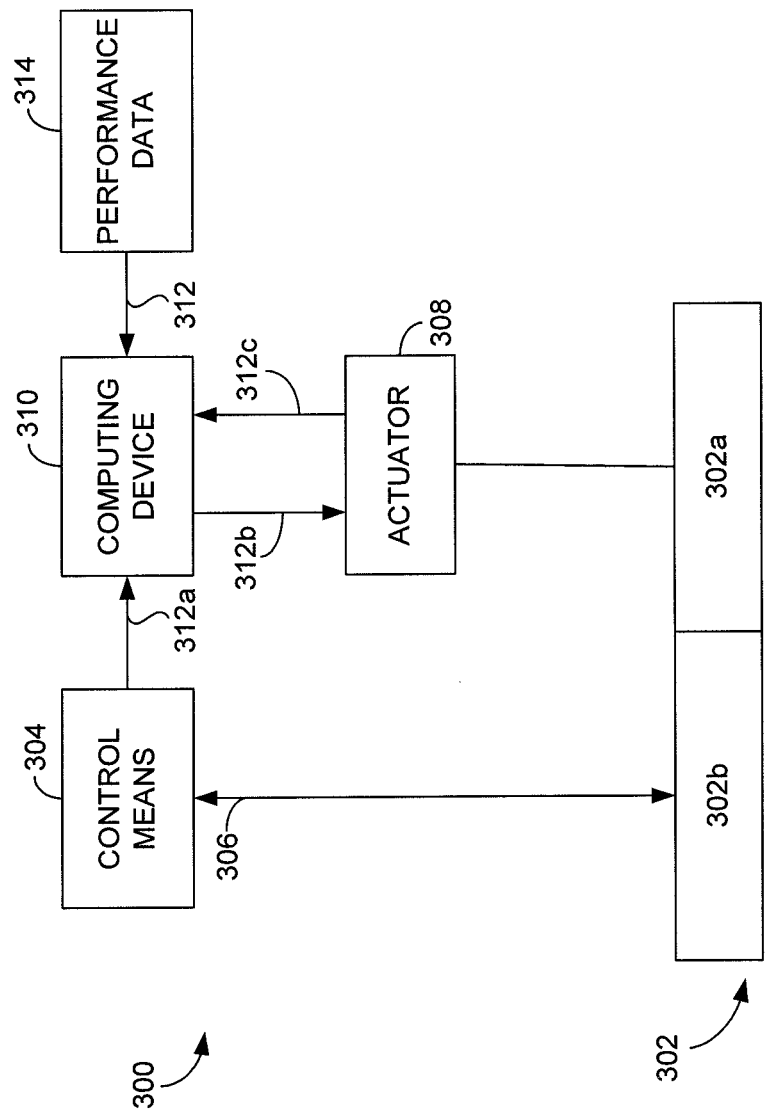
FIG. 3A is a block diagram of an embodiment of the present invention.
Figure 3B:
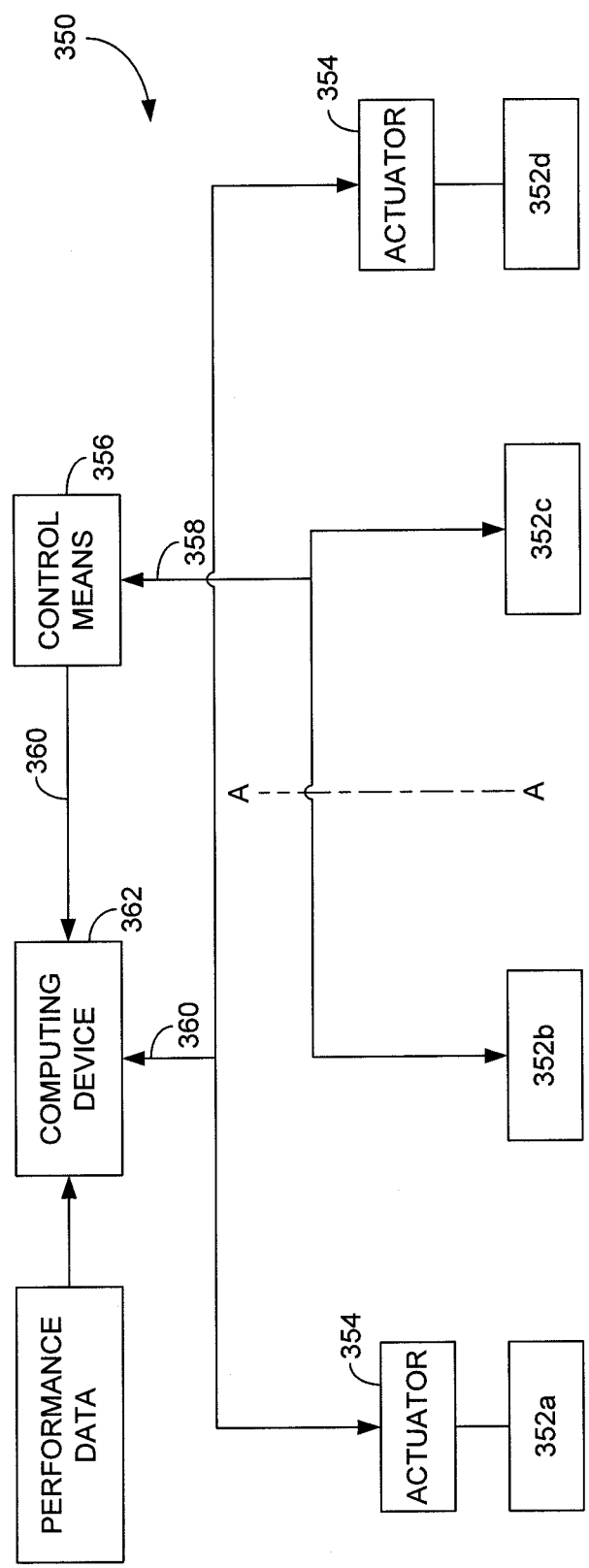
FIG. 3B is a block diagram of an alternate embodiment of the present invention.

Referring now to FIGS. 3A and 3B, block diagrams depicting embodiments of the present invention are shown. Referring first to FIG. 3A, a flight control system 300 comprises at least one control surface 302, such as an aileron, rudder, or elevator, having a plurality of independent segments 302a and 302b. One skilled in the art will understand that the quantity of control surfaces and independent segments will vary depending on at least aircraft class and flight envelope. The flight control system 300 also comprises a control means 304 having at least one force sensor therein for measuring operator effort applied to the control means 304. Typical control means include, but are not limited to, hand-operated controls for pitch and roll such as a yoke or stick, and foot-operated controls for yaw, such as pedals.

In addition to the control means, the flight control system 300 comprises a mechanical linkage 306, that is reversible, and directly couples the control means 304 to one of the independent segments to provide natural feedback to an operator. This mechanical linkage provides direct movement of an independent segment 302b that corresponds to operator movement of the control means 304. The mechanically coupled segment 302b can vary in size with a particular application, but will typically be one-third to one-half of the total control surface 302.

For the embodiment in FIG. 3A, the independent segment 302a is coupled to a powered servo actuator 308. This actuator is in turn coupled to a computing device 310 by signal connections 312. The specific type of signal connections will vary depending on the application, but can include force signals 312a, actuator command signals 312b, and position feedback signals 312c. The computing device 310 is also coupled to the control means 304 by a signal connection 312. In this configuration, the computing device 310 receives the force measurement from the control means 304 by way of the force signals 312a and determines the desired position of segment 302a that corresponds to the force applied to the control means 304. This position is determined from a predetermined schedule which is stored in the computing device 310 and can be based on factors including, but not limited to, measured input force, aircraft normal acceleration, airspeed, and altitude. The computing device 310 provides an actuator command signal 312b to the powered servo actuator 308 to position the independent segment 302a accordingly such that the total combined effects of all of the control surfaces produces the desired aircraft response to the operator's inputs.

In normal, non-failure conditions, the independent segments 302a and 302b both move to achieve the desired aircraft response. However, they may not move to the exact same position since the segments controlled by the computing device are used to optimize handling qualities. That is, depending on operator input, segments 302a may move a greater or lesser distance than segments 302b to accomplish the desired aircraft response. Should the operator attempt maneuvers outside of the allowable flight envelope, the computing device 310 could be used to reduce the effectiveness of segments 302a in order to protect the aircraft structure from damage.

In the event the mechanical linkage 306 jams such that segment 302b becomes inoperable, the remaining segments 302a controlled by the computing device 310 are still operable. Conversely, should a power failure occur in flight such that computing device 310 becomes inoperable, segments 302a will not operate. However, segment 302b is still operable by way of the mechanical linkage 306.

The control surfaces have independent segments that operate independent of each other. One of the segments is connected by a traditional mechanical linkage to the control means in the cockpit and operates and feels to the operator like a traditional control surface, however it has only a portion of the authority of previously monolithic surfaces common in the prior art. The other segment(s) of the control surface are powered and commanded by a computing device based on the operator's input forces to the mechanically-coupled segment. For example, when an operator applies 10 pounds of force into the yoke or stick, that force is transmitted manually to the mechanically-coupled segment, which deflects until the aerodynamic forces balance the operator's input. The same 10 pounds is measured by the computing device, and based on that and other parameters such as flight conditions, the computing device commands the powered segment of the control surface to the desired position. This may or may not be in line with the mechanically-coupled segment. The segments must be split to prevent the actuator force from masking the aerodynamic forces in the feedback to the operator and to allow the powered segment to provide the extra functions such as trim, envelope protection, and stability enhancement.

The control system of the present invention utilizes a plurality of individual segments 302 for a flight control surface. Since each of these segments, both manual and those coupled to the power servo actuators, operate simultaneously, the resulting impact on aircraft attitude and performance is a summation of the effects of the individual segments.

The computing device 310 can also receive performance data 314, including but not limited to altitude, acceleration, and airspeed from a variety of sensors. The computing device 310 utilizes this data to adjust the position of independent segment 302a that is coupled to servo actuator 308, as necessary, to maintain aircraft operation within a desired flight envelope. The present invention can also receive and act on other control commands such as from trim, autopilot, and stability augmentation systems, in place of independent actuators and control surfaces for these systems.

A more detailed embodiment of the present invention is shown in FIG. 3B and pertains to the flight control surfaces found on a wing of an aircraft. In this alternate embodiment, a flight control system 350 comprises four independent segments 352a, 352b, 352c, and 352d, with 352a and 352b on the left wing and 352c and 352d on the right wing, and centerline A-A indicating a fuselage of an aircraft. In this embodiment, each wing has an independent segment that is mechanically coupled to the control means and an independent segment that receives its input from a computing device. More specifically, segments 352a and 352d are each coupled to an actuator 354 and the actuators are, in turn, coupled to control means 356 by way of a signal connection 360 and a computing device 362. The remaining segments shown in FIG. 3B, 352b and 352c, are mechanically coupled to the control means 356 by way of a mechanical linkage 358. Although the embodiment shown in FIG. 3B only discloses two independent segments to each control surface on each wing, the present invention is not to be limited to such a configuration. In fact, the number of independent segments could be greater depending on the type of aircraft and desired flight envelope. Furthermore, alternate embodiments of the present invention may contain different quantity, size, and location of independent segments of the control surfaces without departing from the general scope of the invention.

Figure 4:
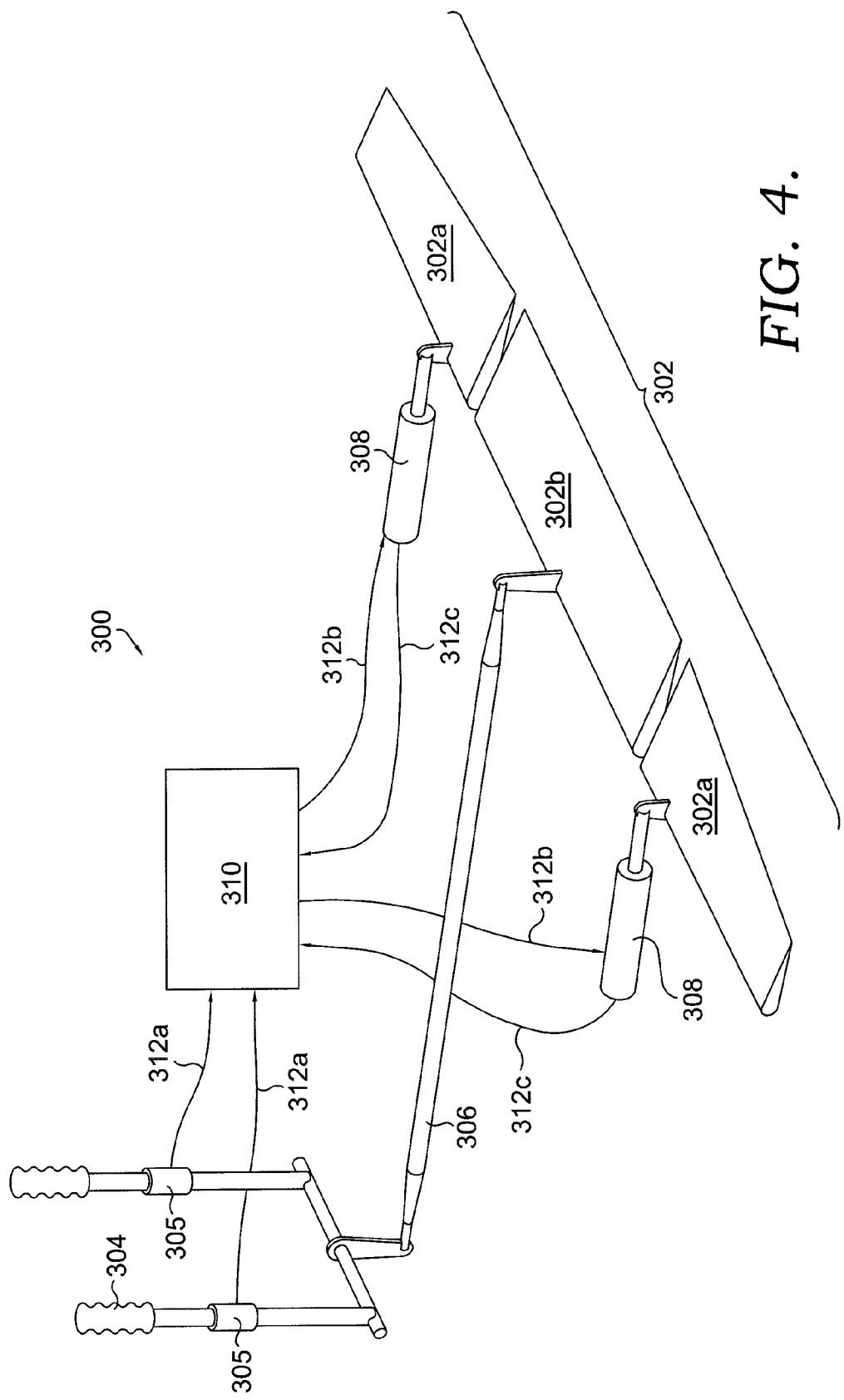
FIG. 4 is a simplified perspective view depicting the features of a first embodiment of the present invention.

Referring now to FIG. 4, a simplified flight control system is shown in perspective view depicting the features of an embodiment of the present invention. The flight control system depicted in FIG. 4 corresponds to the general arrangement for pitch control of an aircraft, such as those found on an elevator. This embodiment can be described in conjunction with the terminology previously discussed in reference to FIG. 3A. The flight control system 300 comprises at least one control surface 302 having a plurality of individual segments 302a and 302b, and a control means 304, which for this embodiment is a set of hand-operated control sticks, one for a pilot and a second for a co-pilot. Located in control means 304 are force sensors 305, which measure force input by an operator, and are also coupled to the computing device 310 by the signal connections 312a. In this embodiment where multiple operators have control means, the computing device 310 will average or prioritize the force inputs to determine the net command desired by the operators. The control means 304 is coupled to a segment 302b by a mechanical linkage 306. Coupled to segments 302a, in the embodiment shown in FIG. 4, are powered servo actuators 308. The servo actuators 308 are coupled to a computing device 310 by command signal connections 312b. Position sensors (not shown) in the servo actuators 308 provide position feedback signals 312c to the computing device 310.

Figure 5:
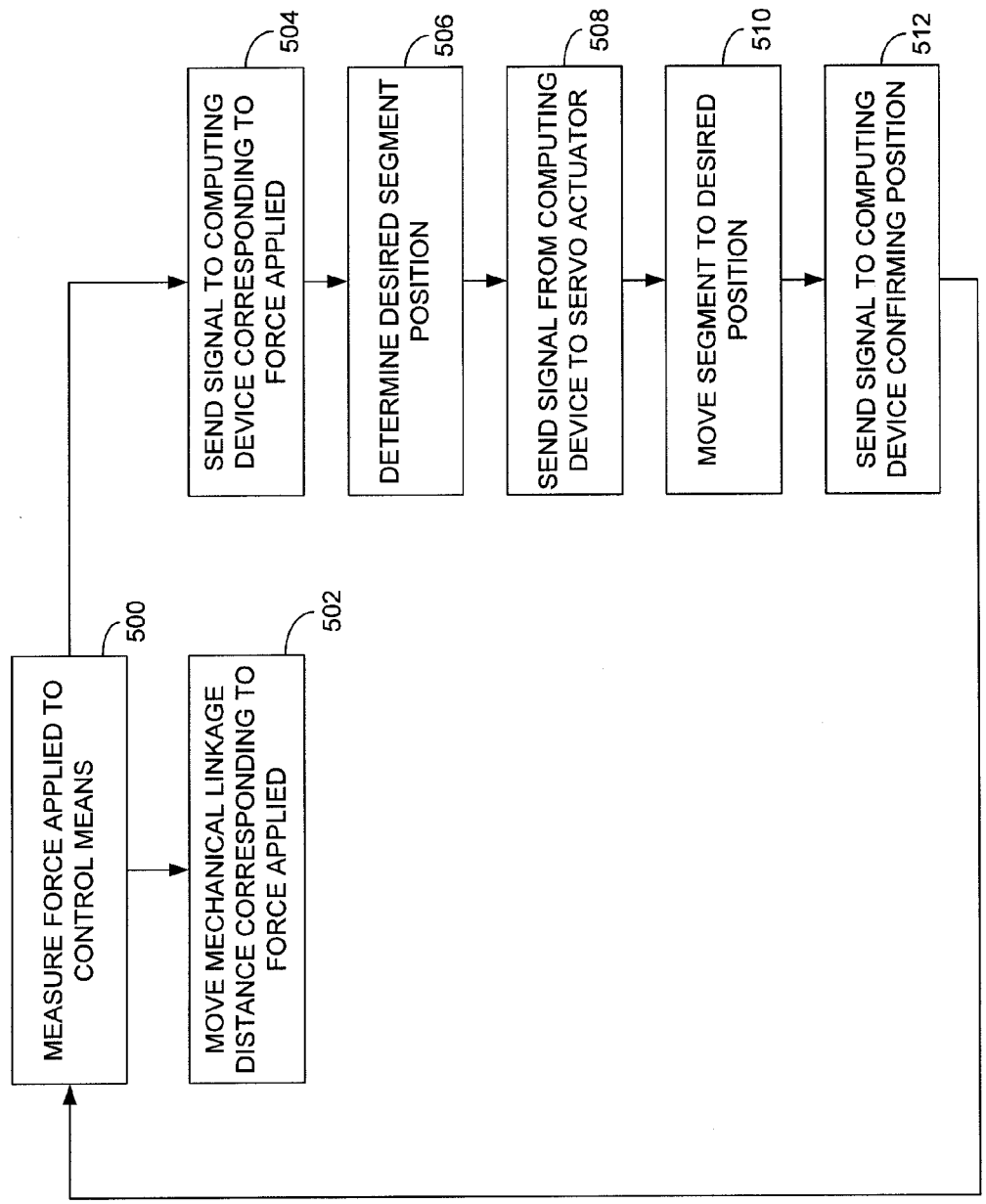
FIG. 5 is a flow diagram depicting an embodiment of the process disclosed in the present invention.

The operation of the control system can best be understood with reference to FIGS. 4 and 5. When movement of an aircraft in a particular direction is desired, the operator applies a force to control means 304. In a step 500, the force applied to the control means 304 is measured by at least one sensor 305. In a step 502, the mechanical linkage 306, which is coupled to the control means 304 moves the individual segment 302b a distance corresponding directly to the movement of the control means 304. The linkage movement will cause control surface 302b to deflect, increasing the aerodynamic forces on that surface, until the operator's applied load and the aerodynamic force on 302b are in equilibrium. A computerized control system operates in conjunction with the manual portion of the control system to move the remaining independent segments of the control surface 302a, such that a desired maneuver is accomplished, such as increasing the aircraft's pitch attitude.

In a step 504 a signal is sent from sensors 305 to the computing device 310 that corresponds to the force applied to the control means 304. In a step 506, the computing device 310 determines a desired position of the remaining segments (302a) that correspond to the force applied by the operator to the control means 304. In a step 508, the computing device 310 sends a signal across connection 312 to the servo actuator 308 corresponding to the desired position. Then in a step 510, the actuator moves the individual segments coupled thereto into the desired position and in a step 512, a signal is sent to the computing device confirming the position of the individual segments.

The position of the segments of the control surfaces are maintained as long as the force level is maintained on the control means. The process then returns to step 500 to measure the force applied to the control means 304. Should the force applied change, either greater or smaller or direction change, then the individual segments making up the control surface will move accordingly, including the manual surfaces and those controlled by the power servo actuators and computing device.

Figure 6:
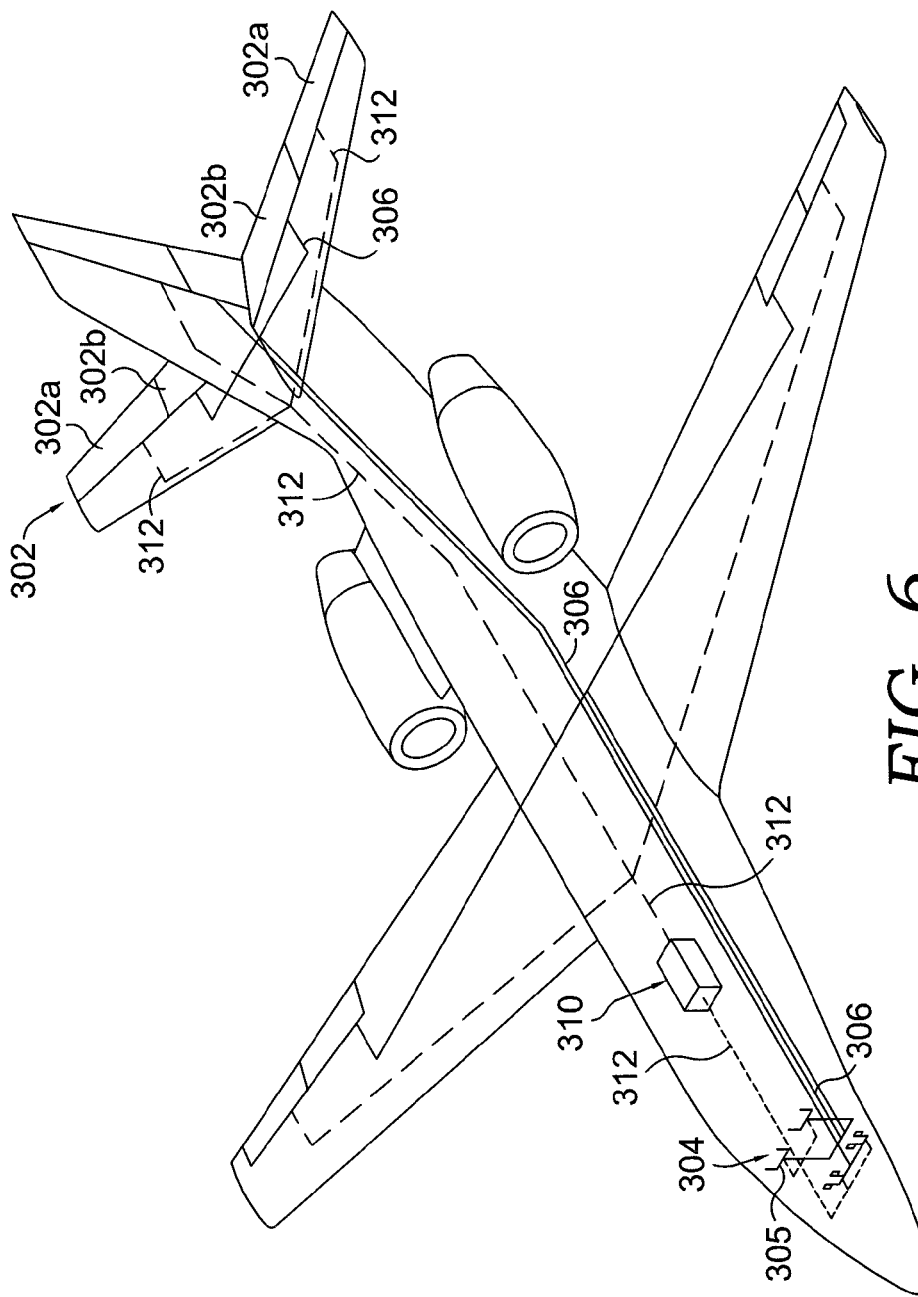
FIG. 6 is a perspective view of an aircraft incorporating the present invention.

An embodiment of the present invention is shown on an aircraft in FIG. 6, including control surfaces similar to those shown in FIG. 4. Utilizing the terminology previously discussed, control surface 302, also referred to as an elevator, has individual segments 302a and 302b, on each side of control surface 302. Segments 302a are coupled by signal to control means 304 through computing device 310, as indicated by a dashed line, while segments 302b are mechanically coupled to the control means 304 by mechanical linkage 306, as indicated by a solid line. The control means 304 has force sensors 305 that send a signal across signal connection 312 to a computing device 310. The computing device 310 then sends a signal across another signal connection 312 to actuators 308 (not shown), which are in turn coupled to segments 302a.

Mechanical characteristics of the mechanical linkage 306, the mechanical control surfaces 302b, 352b and 352c and flight and environmental conditions alter the forces necessary to move segments 302b shown in FIG. 3A and segments 352b and 352c in FIG. 3B and to affect the movement of those segments, and exert more or less pressure on the control means 304. As the forces on those segments vary, the changing force is communicated through mechanical linkage 306 to control means 304. This communication of varying forces required to move the mechanical control surfaces provides the natural feel to the pilot of a mechanical control system.

However, the varying forces required to alter the position of mechanical linkage 306 and the mechanical control surfaces also causes changes in the force applied by the pilot on the control means 304. The changing force is detected by force sensors 305 and can thus cause undesired movement of the powered control surfaces that are controlled by computing device 310, which is not optimal. For example, when a pilot holds the control means 304 at a relatively steady position, vibrations and other small unintended perturbations from that position will not result in movements of the mechanical control surfaces because of a frictional deadband that exists around a steady position held by the mechanical system. The control means 304 detects the vibrations and other small unintended perturbations and provides them to computing device 310 which may direct the corresponding control surface to be actuated in response to the unintended perturbations when it should have been held steady. Such undesired actuations by the computing device 310 may cause unintended flight behavior. The computing device 310 is intended to control the powered control surfaces 302a and 352a and 352d in a manner that is compatible and consistent with the mechanical control surfaces, and so the unintended control inputs must be filtered from the force signal provided by the control means 304 to the computing device 310. Optional devices and methods for countering the undesired control inputs caused by the mechanical characteristics of the system including the segments 302b and 352b and 352c are discussed below with respect to FIG. 8.

For aircraft operating with significantly more gross weight and at even higher airspeeds, e.g., commercial jetliners, the reversible mechanical manual portion of the system described in the above may prove insufficient. Referring back to the first embodiment disclosed in FIG. 4, the mechanical arrangement comprising control means/stick 304 and link 306 may be unable to provide the power necessary to properly actuate control surface 302b, and variations in the control surface hinge moments may be unable to provide the appropriate feedback and feel to the pilot.

Figure 7:
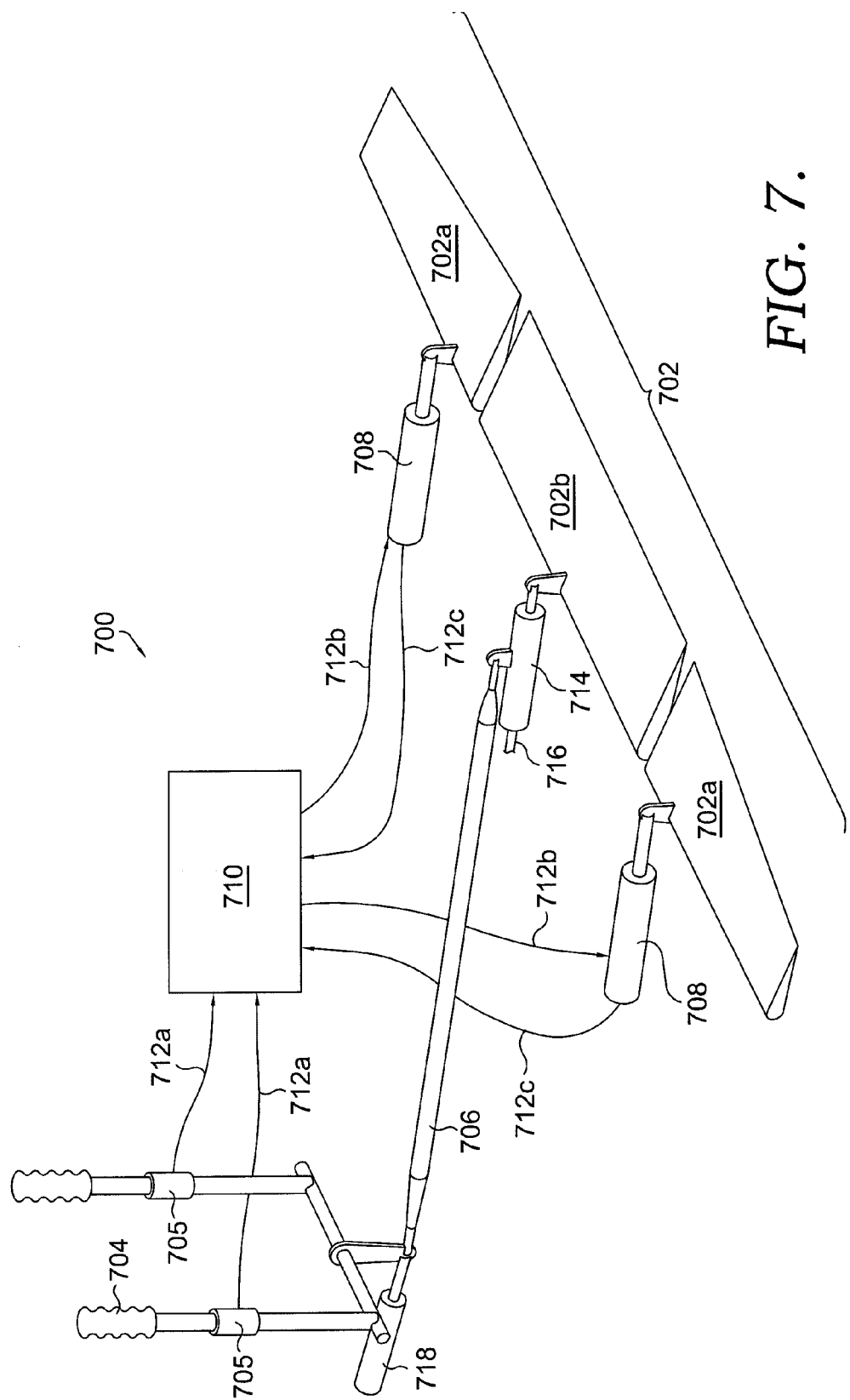
FIG. 7 is a simplified perspective view depicting the features of a second embodiment of the present invention.

Under these circumstances, a second embodiment like that shown in FIG. 7 may be utilized. As can be seen from the figure, this embodiment 700, like the first, comprises at least one control surface 702 having a plurality of individual segments 702a and 702b. Like with the first embodiment, surfaces 702a are operated using electronically controlled servoactuators 708. And also like the first embodiment, a mechanical linkage 706 is used which is activated using a hand-operated control stick 704 including force sensors 705 which measure force input by an operator, and are also coupled to a computing device 710 by signal connections 712a.

This embodiment operates in substantially the same way as was described for the FIG. 4 embodiment except that drive linkage 706 is adapted to selectively expand or contract a mechanically-activated power control device 714. At the aft end, device 714 is used to activate control surface 702b. At the forward end, PCU support rod 716 is secured to a fixed structural member (not shown) on the aircraft so that rod 716 such that PCU 714 can bear against it when activated (expanded or contracted).

When the pilot moves the cockpit controls 704 from a first position to a second position, device 714 will receive the resulting mechanical displacement through linkage 706 and provides the force necessary to rotate control surface 702b to a corresponding and directly related angular displacement. Cockpit controls 704 are shown as being hand operated in FIG. 7, but could alternatively be a foot-operated arrangement. In some embodiments, power control device 714 is a mechanically driven power control unit (PCU). One skilled in the art will recognize that mechanically driven PCUs are commercially available powered devices which are typically mounted on the trailing edge or other longitudinal stabilizing surface of the aircraft and can be used to obtain pitch-control moments. The mechanically-driven variety used herein receive mechanical input from an input rod and then irreversibly produce an output having the force necessary to create a corresponding angular displacement of the control surface when the craft is in flight. Although a mechanically-driven PCU is used in the second embodiment here, however, other devices exist which might be used herein as well that would fall within the broad objectives of the present invention.

Device 714 is unidirectional in that, although it acts on control inputs received from linkage 706, forces received from the control surface 702b, e.g., due to wind impingement, will not be in any way experienced back through linkage 706 to the pilot. Because the pilot does not experience natural feedback forces from the air loads on the control surfaces, an artificial feel system 718 is employed on the mechanical control system.

Artificial feel system 718 is at the other end of link 706, and connected into the controls 704 in a known manner, is an artificial feel system 718. System 718 provides a spring-back effect which will tend to center the control column 704 to a neutral position. Thus, if you pull stick 704 back from neutral, the spring will resist and try to push it back to neutral, and if you push stick 704 forward from neutral, it will try to pull it back. The strength of the spring should be selected such that it provides the appropriate amount of spring back force to the pilot such that the pilot's interaction with the control system is similar to that of an airplane with natural force feedback. More complex feel systems and/or force variants could be used as well. For example, the variants could have non-linear force curves, or modify the forces based on aircraft performance (i.e., make the forces increase as the airplane goes faster).

The particular artificial feel system used in the disclosed embodiment is a bungee system. But in its most elemental form, system 718 could be a spring sized appropriately to generate favorable pilot forces for a given stick deflection. One skilled in the art will recognize there are many possible variations of such an artificial feedback system, including systems that use other devices such as bobweights and dampers, or are variable in their response relative to aircraft performance parameters.

Like with the last embodiment, the FIG. 7 electronically controlled actuator devices 708 will move the outer portions 702a in concert with the partially mechanically moved inner portion 702b. Again, this is accomplished using a computing device 710 which receives signals from force sensors 705. These signals will be representative of operator effort, which is in turn a function of the operating characteristics of the artificial feel system. Processes executed on computing device 710, then will electronically control the actuators 708 for the purpose of controlling the position of portions 702a. In normal, non-failure conditions, the independent segments 702a and 702b both move to achieve the aircraft control. As with the previous embodiment, the surfaces may not move exactly together, but the aerodynamic sum of their effects results in the desired aircraft response. Also as in the previous embodiment, the computer controlled surfaces can be utilized to optimize aircraft handling qualities; unlike the previous embodiment, a variable artificial feel system also allows some optimization of the handling qualities through the mechanically commanded surface.

With respect to operational processes, the FIG. 7 embodiment functions in substantially the same manner disclosed in FIG. 5, except that step 502 would include the assistance of mechanically-driven PCU 714, and artificial feedback system 718 would give the pilot the spring back feel described above.

The force signals 312a are an aggregate signal comprising a component of force applied by the pilot in opposition to aerodynamic forces on the control surfaces, and a component of force in response to the mechanical properties of mechanical linkage 306, the control surface segments 302b and 352b and 352c, and the other mechanical components of the system. Computing device 310 alters the position of control surface segments 302a and 352a and 352d as a result of the aggregate force signal. In an embodiment of the disclosed system, the computing device 310 alters the position of control surface segments 302a and 352a and 352d based only on the force attributable to the aerodynamic pressures on the control surface segments 302b and 352b and 352c, and not on forces required to overcome the mechanical properties of the system.

The computing device 310 also alters the position of control surface segments 302a and 352a and 352d immediately upon changes in the pilot force inputs. As discussed further below, the mechanical control surfaces do not immediately respond, but are subject to frictional deadbands and linkage stretching, and other mechanical characteristics that delay the response of the mechanical control surfaces. In an embodiment of the disclosed system, the computing device models these mechanical characteristics to alter the position of the automatic control surfaces 302a and 352a and 352d with similar delays and deadbands.

Without modifications to filter the control signals 312a to model the characteristics of the mechanical system the computing device will provide resulting in undesired movements of powered control surfaces 302a and 352a and 352d unless the undesirable components of the force input signal 312a are removed.

In an embodiment of the system, computing device 310 alters the position of control surface segments 302a and 352a and 352d in response to a filtered force signal component applied by the pilot that alters the force signal in a manner that modifies certain mechanical characteristics of the system. Thus, in an alternative embodiment, computing device 310 includes a filter to remove the component of the force signal attributable to certain mechanical characteristics of the system.

Referring now to FIG. 3 as discussed above in embodiments of the system, though with applicability to all other embodiments of the system, undesirable force inputs are described. The mechanical attributes of the mechanically controlled segments 302b and 352b and 352c alter the force signals necessary for the pilot to move the surfaces and cause force inputs that do not correspond to desired movement of the control surfaces 302a or 352a and 352d. The dynamic aerodynamic forces on the control means 304, linkage 306 and the control surface 302b also introduce extraneous command signals into the force signals 312a that do not correspond to desired movements of control surfaces 302b and cause undesired movements of the powered control surfaces. Examples of the physical characteristics of the control system in combination with the dynamic aerodynamic forces on the system that create extraneous force signals 312a include, among others, frictional deadband, damping, inertia and stiffness of the system.

Frictional deadband is a characteristic of a mechanical control system such that small movements of control means 304 around a steady state position do not cause movement of the manual control surfaces 302b due to frictional forces in the system. An example of such movements include the movement of the control means 304 in response to vibrations in the aircraft, or in the pilot's hands, which do not cause movements of control surfaces 302b. Once the movement of control means 304 goes beyond a certain distance the frictional forces are overcome resulting in movement of control surfaces 302b. Without the filter described herein, the automatically control system for surfaces 302a or 352a and 352d would not disregard the small movements around the steady state position leading to fluttering in those automatically controlled surfaces. Another approach to remove these undesired vibrations would include a linear digital filter. However, this would introduce phase lag across the frequency range that is not desirable for pilot handling qualities.

The frictional deadband is not always located around the zero point of control means 304, but instead moves to any steady state position assumed by control means 304. For example, if a certain force is applied to control means 304 causing a deflection of control means 304 and the force is held constant for a period of time. The frictional deadband will exist around the deflection caused by the constant force, such that small transitory additional forces or a small transitory reduction in the applied force will not result in movements of control surface 302b.

In the system described above, control means 304 detects transitory movements within the frictional deadband and incorporates those in force signals 312a. This results in frequent small movements of powered control surfaces 302a and 352a and 352d when unpowered control surfaces 302b do not move due to frictional forces. These additional movements of the powered control surfaces 302a and 352a and 352d are not desirable. The force input filter described further below filters such signals from force signals 312a and does not include them in the command signals 312b.

Another characteristic of the mechanical control system is damping due to the flight conditions, resistance within the system caused by components such as the bearings or any other component causing drag. Damping can be modeled as a force proportional to the velocity of the damped system. In the mechanical control system, the damping effect is proportional to the velocity of the control means 304.

The mechanical control system, like any system, has an inertia that resists any change in velocity. The inertia can be measured experimentally for a specific control system and included in the models of the force input command filter described herein.

The mechanical control system also has a stiffness that resists movement resulting from the hinge moment of the control surfaces. The hinge moment of a specific control surface is dependent on the configuration of the surface such as its angle of attack and the surface are located aft of the hinge axis. The hinge moment is also dependent on aerodynamic conditions such as the dynamic pressure on the control surface. The hinge moment may be estimated in wind tunnel and flight testing.

The force input command filter described herein incorporates algorithms that model the various system characteristics and alters the output command signal 312a to the powered control surfaces. As will be described in more detail below, the filtered output command more closely conforms the powered control surfaces to the position of the unpowered control surfaces. Although the position of the powered and unpowered control surfaces will often not be the same due to the command filters, the powered control surface will be controlled in a manner that is closer to the unpowered control surface than would occur if the unfiltered command signal was sent to the powered control surface.

The embodiment of the pilot force input command filter described herein is software executed on the computing device 310, which is often the flight control computer used by other systems on the aircraft. In alternative embodiments the pilot force input command filter could be software executed on a dedicated processor or could be implemented in firmware or hardware implementations and still be within the scope of the filter described and claimed herein.

Figure 8:
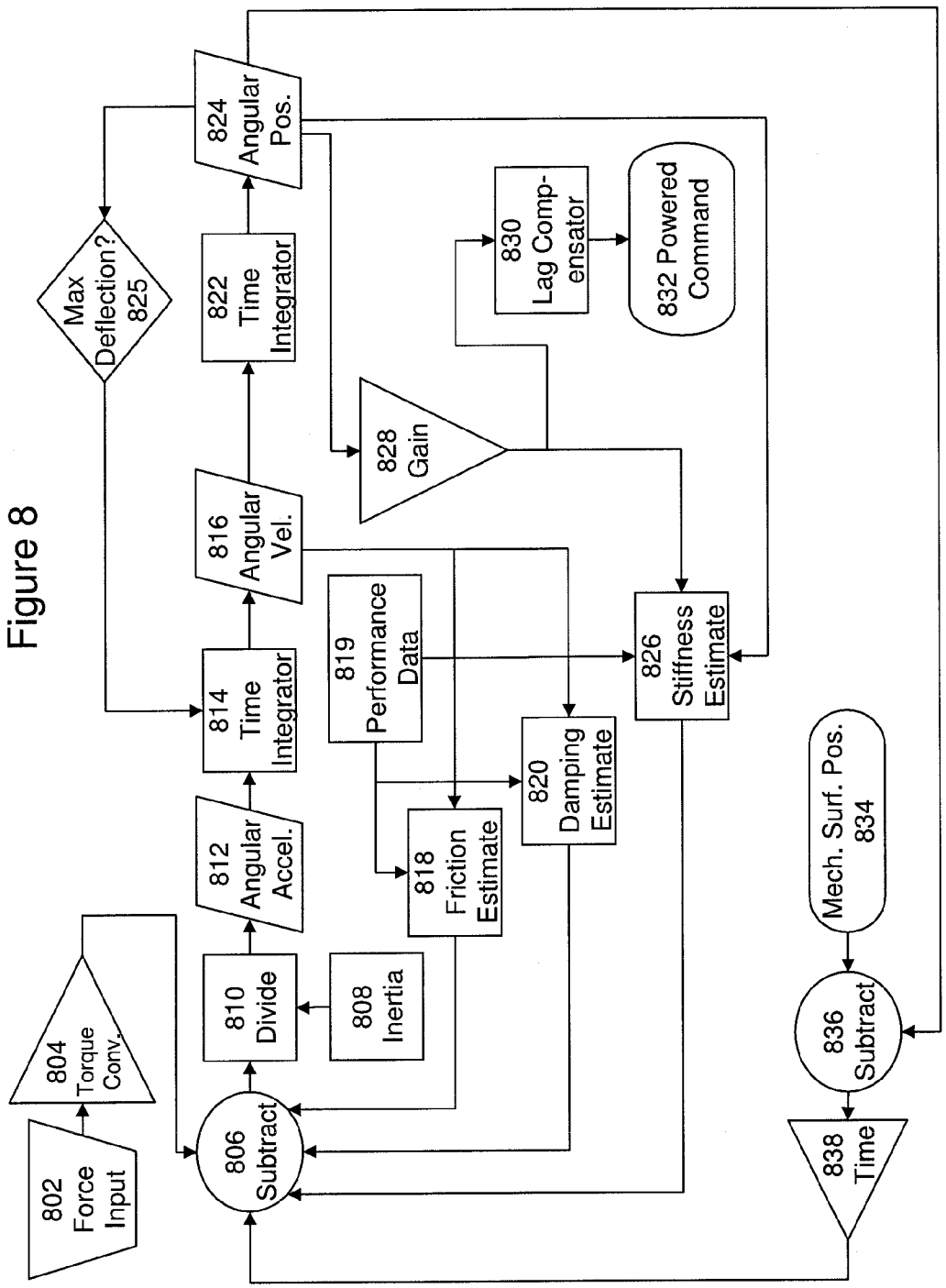
FIG. 8 is a flow diagram depicting an embodiment of the process of the pilot force input command filter.

Referring now to FIG. 8, a process utilizing an embodiment of the pilot force input command filter is depicted. At step 802 the pilot or other use of the system inputs a force command. This is typically performed by manipulating a yoke or control stick in the cockpit of the aircraft, although the specific means of accepting the force input are not limiting of the force input command filter. Control means 304, referenced in earlier figures, provides the means for the pilot to input the force signal.

The force input received in step 802 is a force, typically measured in lbs or newtons. The force value is converted to a torque value in step 804. The conversion will be specific to the control means 304 and its physical configuration. For example, in the case where control means 304 comprises a control stick the torque corresponds to the length of the control stick to the grip and the force applied to the lever arm at the grip. In that case the torque corresponds to the cross product of the applied force vector and the lever arm vector. The conversion routine must be customized for the mechanical control system in which it is installed.

The torque value is then reduced in step 806 by the output of the various filters to be described in detail below. The output of step 806 is then input into the filters forming a feedback loop.

The first algorithm compensates for the inertia of the mechanical control system and further prepares the force measurement for use in the other algorithms described herein. The moment of inertia of the system is measured for the mechanical control system before use and provided as constant 808 for use by the filter. The torque value output from step 806 is then divided by the moment of inertia. This output 812 of step 810 is no longer a torque value, but is an estimate of the angular acceleration of the control means 304, since the angular acceleration of a mass is equal to the torque applied to the system divided by its moment of inertia.

The angular velocity output 812 is then integrated over time in step 814 to produce an estimate of the angular velocity 816 of the control means 304. This prepares the input for the frictional deadband and damping algorithms, which are dependent on the angular velocity of the control means 304.

The frictional deadband algorithm 818 receives the angular velocity 816 and produces a friction torque by which the input torque is reduced in step 806. There are a variety of frictional deadband models that are acceptable for use in the filter 818. Without limiting the scope of acceptable models that may be utilized in the force input filter, one such model is disclosed in "A Generalized Maxwell-Slip Friction Model appropriate for Control Purposes," V. Lampaert, F. Al-Bender, J. Swevers, IEEE PhysCon 2003, St. Petersburg, Russia. The calculated friction torque is then input into step 806. The frictional deadband algorithm 818 may also utilize performance data 819 regarding the current flight conditions, such as aerodynamic pressures and environmental conditions around the aircraft.

The damping algorithm 820 also accepts the angular velocity 816 as an input. The damping algorithm multiplies the velocity 816 by a damping coefficient that is dependent on flight conditions and the mechanical components of the control system, such as bearings and other components that introduce friction. The flight conditions are input to the damping algorithm as performance data 819. The value of the damping coefficient can be determined by flight and wind tunnel testing and stored in the computing means 310 for use by the command filter process. The damping algorithm 820 outputs a damping torque which is input into step 806.

The angular velocity 816 is then integrated over time again in step 822 to calculate an estimated angular position 824. The control surfaces have a maximum possible deflection based on the aircraft design, and typically stops are provided to limit the deflection to an acceptable range. The estimated manual control surface position must reflect the limited actual range of motion of the manual control surfaces. When the control means 304 reaches maximum deflection, the operator may continue to apply force to the control means even though the control means 304 are no longer actually moving in response to the force. This force would cause continued estimated acceleration and velocity despite the lack of actual movement, and the estimated manual control surface position would increase continuously and beyond the actual physical limits of the manual control surfaces.

To counteract this overestimation of position, in step 825 a determination is made regarding whether the control surfaces are at the max position. The determination is an input to integrator 814, allowing integrator 814 to stop estimating the continued velocity of the control surfaces once the stop is reached. A known method of anti-windup protection may be used to properly limit the velocity integrator 814 value when the position integrator 822 has reached the limit.

The angular position 824 is input into step 828 where a gain factor is applied to the estimated manual surface position to calculate the estimated powered surface position. The gain factor is scheduled by the system designer and varies based on flight conditions and aircraft configuration. The gain provides for a boost in the powered control surface action in certain flight regimes. The powered surface position estimate is then input into the stiffness filter 826 along with the unpowered surface position estimate 824.

In step 824, a stiffness torque is calculated based on the hinge moment of the mechanical control surfaces based on wind and flight tunnel testing of the control system. The powered surface position estimate is utilized by step 824 to adjust the hinge moment based on the position of the powered control surfaces, which are typically located adjacent to the unpowered control surfaces, and thus affect the hinge moment, for example through changes in the dynamic pressure on the unpowered control surfaces. The damping torque is then input into step 806 to reduce the pilot input command force.

The powered surface position estimate from step 828 is also input into an actuator lag compensator 830 as are commonly known for use in control systems. In an embodiment of the system described herein this lag compensator may be a Tustin transform. The output from the lag compensator 830 is the final filtered powered surface command 832 which is then provided to the other components of the controls systems of the airplane for use controlling the aircraft as command signals 312b.

In some embodiments of the pilot force input command filter, an optional long term position estimate correction loop may also be provided. The actual deflection of the mechanical control surface is measured in step 834 and the difference between the actual position and estimated position from step 824 is then compared. This correction factor is multiplied by a time constant in step 838 to prevent the lag in the system from triggering overcorrection due to short term position differences, and the result is included into the feedback loop in step 806.

The pilot force input command filter may also allow the pilot to continue to have effective control of the powered surfaces even when the mechanical control surfaces are jammed. A jam in the mechanical control surface prevents the movement of the control means 304, but still allows the pilot to input force signals into the control system. This is accomplished by the pilot applying a force to the control means. The control means are jammed in this scenario so it does not move, but still measures the applied force. Since the pilot input command filter processes the force applied by the pilot, and not the actual movement of the control means, it still processes the pilot force input and provides command signals to the powered control surfaces, even though the mechanical control surfaces remain jammed.

Figure 8A:
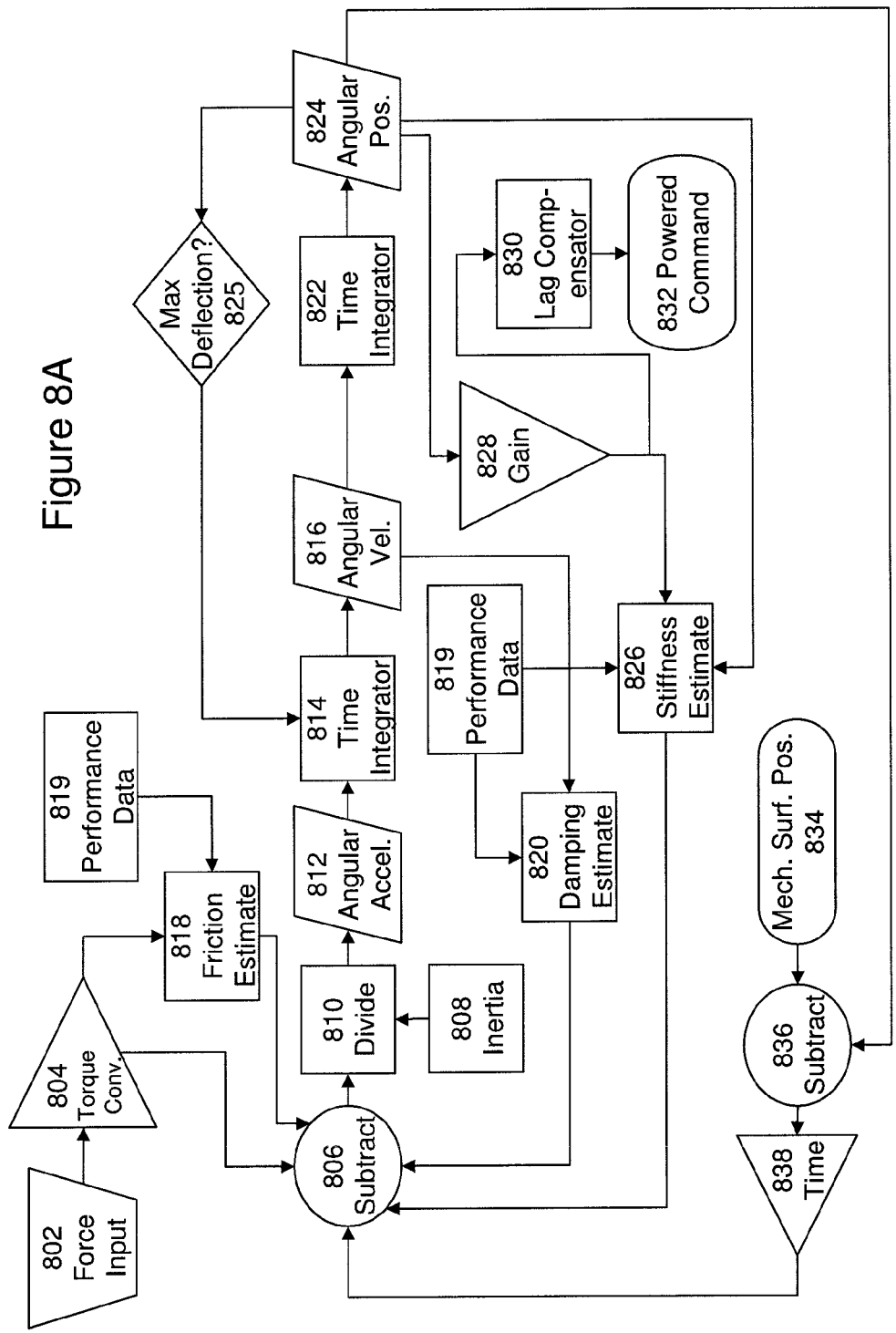
FIG. 8A is a flow diagram depicting an embodiment of the process of the pilot force input command filter.

Referring now to FIG. 8A, an alternative embodiment of the pilot force input command filter is depicted. This embodiment utilizes a modified version of the frictional deadband algorithm to model the same physical characteristics of the control system of an aircraft. In the embodiment described in relation to FIG. 8, a frictional deadband algorithm is applied to the estimated angular velocity of the control means 304. In the alternative embodiment depicted in FIG. 8A this deadband algorithm is applied to the force input directly without converting it into an estimated acceleration and velocity.

In the alternative embodiment of the filter shown in FIG. 8A, the force input received in step 802 is converted to a torque measurement in step 804 and then provided as an input to step 806 while also being provided as an input to step 818 where the deadband algorithm is applied to the force or torque signal directly. In other embodiments the deadband algorithm step 818 may be applied directly to the force input 802 prior to conversion to a torque signal in step 804. The deadband algorithm is applied to the torque signal to produce a frictional torque value by which the torque signal from step 804 is to be adjusted. The output of the deadband algorithm 818 is then provided to step 806 as input for subtraction from the torque input received from step 804. The performance data 819 may optionally be provided to step 818 similarly as in the first embodiment of the filter. The remainder of the process depicted in FIG. 8A proceeds as described in relation to FIG. 8 above.

The pilot input force command filter described in relation to FIGS. 8 and 8A is incorporated into flight control systems by incorporating them into the appropriate control laws. Referring now to FIG. 9, an example of a roll control law incorporating the pilot force input command filter is depicted. The details of the roll control law do not form or limit any part of the force input command filter, but serve only to show an example of how the force input command filter could be incorporated into a flight control system.

The roll control law depicted in FIG. 9 receives various inputs from the aircraft controls and produces output commands to control the ailerons and roll spoilers in the example aircraft. In other aircraft the roll control output commands might be for elevons, spoilerons, or other types of control surfaces. The roll control law utilizing the force input command filter may include other aspects and elements not shown in FIG. 9.

The roll control law may have various inputs including the speedbrake controls 900, the roll trim settings 902, the auto-pilot input 904, aileron-rudder interconnect 908, and the pilot input to control means 304 as filtered by the pilot force input command filter 906. The inputs have various factors that contribute to the position of the roll control surfaces. The roll trim 902 provides the pilots the means to trim the aircraft for normal flight. The auto-pilot directs commands from the auto-pilot control system to the powered control surfaces. The aileron-rudder interconnect provides a linkage between the yaw controls of the aircraft, automatically generating roll input in response to certain yaw control inputs.

Figure 10:
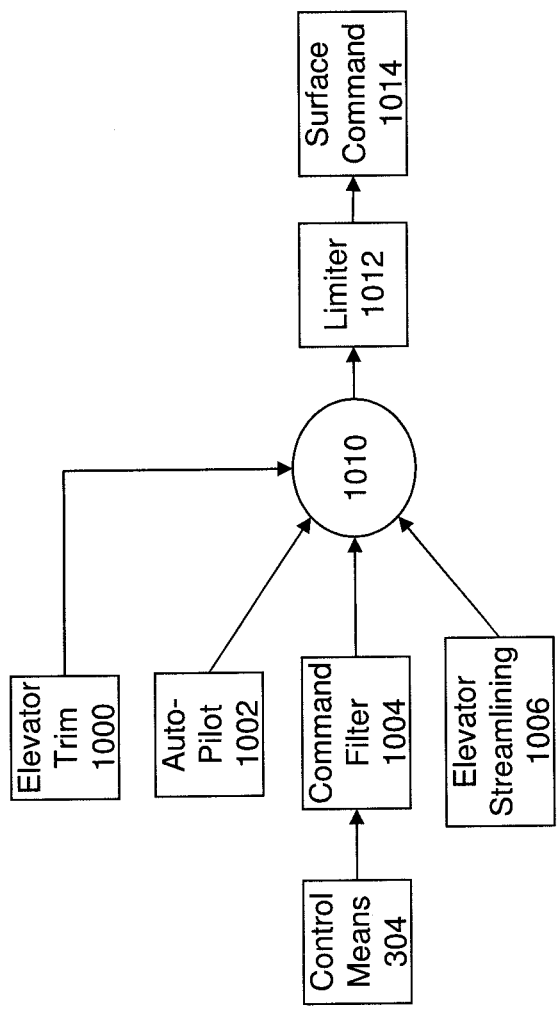
FIG. 10 is a flow diagram depicting an embodiment of the process of the pilot force input command filter in a pitch control law.

Referring now to FIG. 10, an example of a pitch control law incorporating the force input command filter is depicted. The pitch control law utilizing the force input command filter may include other aspects and elements not shown in FIG. 10. The pitch control law may have various inputs including the elevator trim 1000, auto-pilot 1002, elevator streamlining 1006, and the pilot input to control means 304 as filtered by the pilot force input command filter 1004. The various inputs are aggregated in step 1010, and limited in step 1012 to match the physical constraints of the control surfaces movement ranges. The result is the elevator surface command 1014 which directs the powered surface to the desired position.

Figure 11:
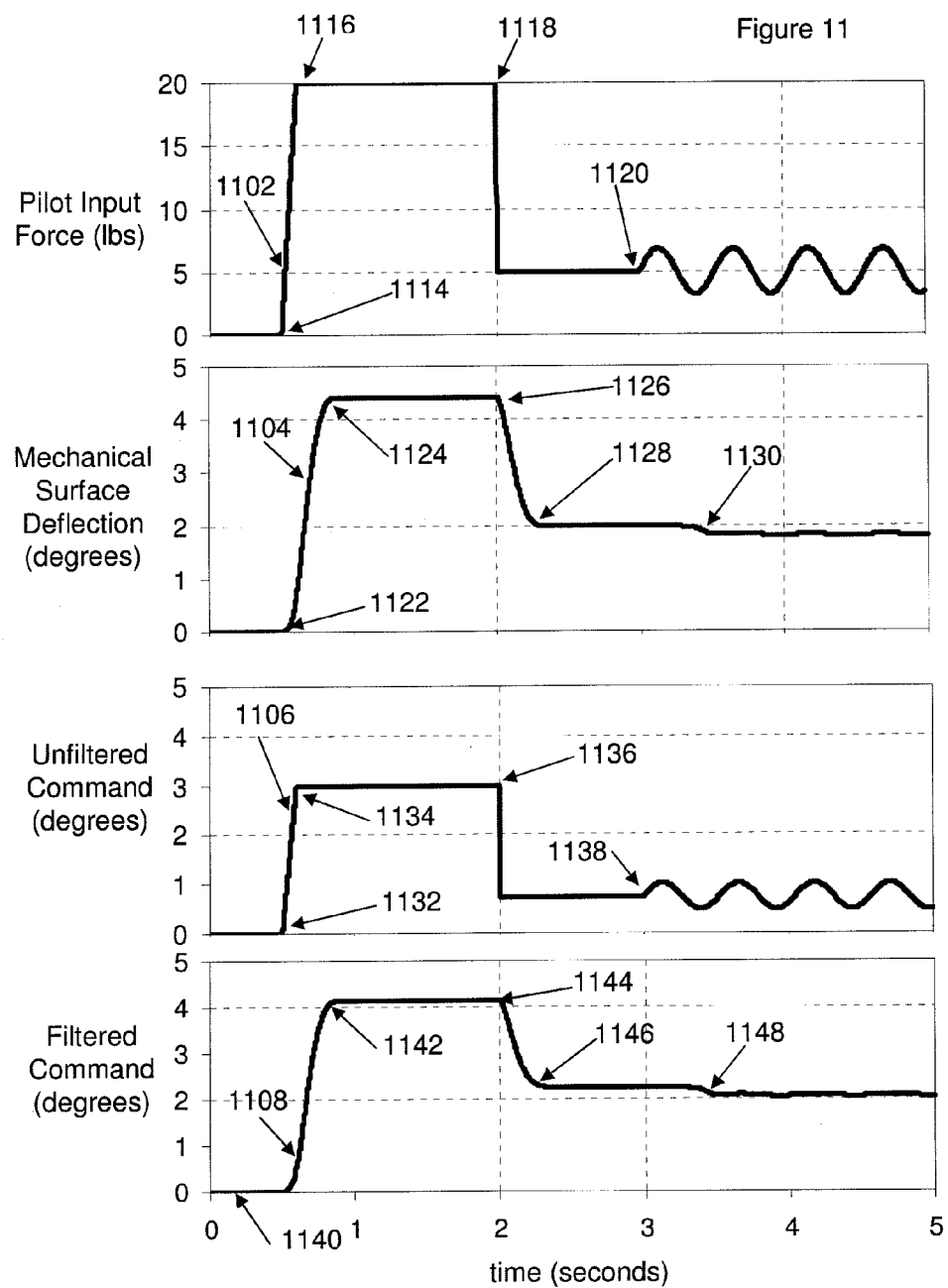
FIG. 11 is a time series diagram showing the position of various components in an embodiment of the system performing the process of the pilot force input command filter responding to certain pilot force input.

Referring now to FIG. 11, a time series diagram is shown depicting the force input of a pilot and the position of various surfaces and components in the system resulting from the pilot input. The force input by the pilot on control means 304 is shown by line 1102. As described above, the system includes certain control surfaces that are positioned mechanically by the control means, such as surface segments 302b, 352a and 352d. The angular deflection in degrees of the mechanically actuated surfaces is depicted by line 1104. Line 1106 represents the deflection of the powered control surfaces as a result of command signal 312b filtered by the force input filter described herein. Line 1108 represents the deflection of the powered control surface as a result of command signal 312b that has not been filtered by the force input filter described herein.

At time 1114, a pilot begins applying force to control means 304, which force steadily increases from 0 lbs to 20 lbs at time 1116. After time 1116 the pilot holds the force steady at 20 lbs until time 1118. Referring to line 1104, at time 1122 the unpowered control surface begins to deflect as a result of the pilot force input at time 1114 and achieves a maximum deflection of 4.5 degrees at time 1124. As a result of inertia and frictional deadband, the deflection is delayed slightly after the application of force at time 1114. Similarly the unpowered control surface does not achieve the steady state deflection until time 1124, after the pilot has reached steady state force application at time 1116.

Referring to line 1108, the control means 304 generated the force input signal 312a based on pilot input, and computing device 310 generates a position command for the powered surfaces that corresponds to the force input without the filter described herein. The position command does not include the effects of inertia or friction that alter the position of the unpowered control surface. As a result the powered control surfaces will react in a manner that is significantly different than the unpowered control surfaces if on filter is applied to the command signal 312b.

Without the filter, the powered surface command will cause the powered surface to deflect immediately at time 1132 and ending at time 1134, much before the unpowered surface reaches its deflection. As a result of the immediate response, the airplane will react more quickly than it otherwise would and in a manner that pilots are not accustomed to by current control surfaces.

Referring to line 1106, a command signal 312b filtered by the force input filter is depicted. As can be seen at time 1140 the filtered signal incorporates a delay modeled after the frictional deadband and the inertia of the system that inhibits the initial response at time 1140 and delays the steady state until time 1142. As can be seen from lines 1104 and 1106 are similar in response thus providing a more predictable response to the entire system for a pilot.

At time 1118, the pilot instantaneously reduces the force from control means 304 to a value of 5 lbs. The deflection of unpowered control surface 1104 reduces over a period of time to 2 degrees until at time 1128 it reaches a steady state. The unfiltered command signal immediately reduces the deflection of the powered control surfaces at time 1136. Filtered command signal 1106 performs in a similar manner to the unpowered control surface by reduces over a period of time beginning at time 1144 and reaching a steady state at 1146.

At time 1120, an oscillating force signal is input into control means 304. The periodic signal could be the result of vibration in the airplane or some other periodic force on the system. As a result of the inertia of the system, the frictional deadband, general damping and stiffness in the system, the unpowered control surface does reflect the periodic changes in deflection corresponding to the periodic force input. There is some adjustment in the deflection of the unpowered surfaces at time 1130 but this quickly assumes a steady state deflection.

The unfiltered powered command signal shown by line 1108 contains the periodic force signal at time 1138 at full amplitude. This is undesirable in that it causes periodic deflection of the powered control surface which may cause instability in the aircraft and does not mimic the typical behavior of aircraft control systems. The filtered command signal 1106 provides command signals that are very similar to the deflection of the unpowered control surface, with only minimal oscillation resulting from the large input force oscillation.

A general comparison of line 1106 depicting a command signal generated by an embodiment of the force input command filter to line 1108 depicting a command signal before processing by an embodiment of the filter shows that the filtered signal 1106 closely follows the mechanical control surface position shown by line 1104 throughout the force input commands depicted by line 1102. Utilizing the filtered signal 1106 to control the position of the powered control surfaces on the aircraft provides an improved feel and performance of the control system.

Figure 12:
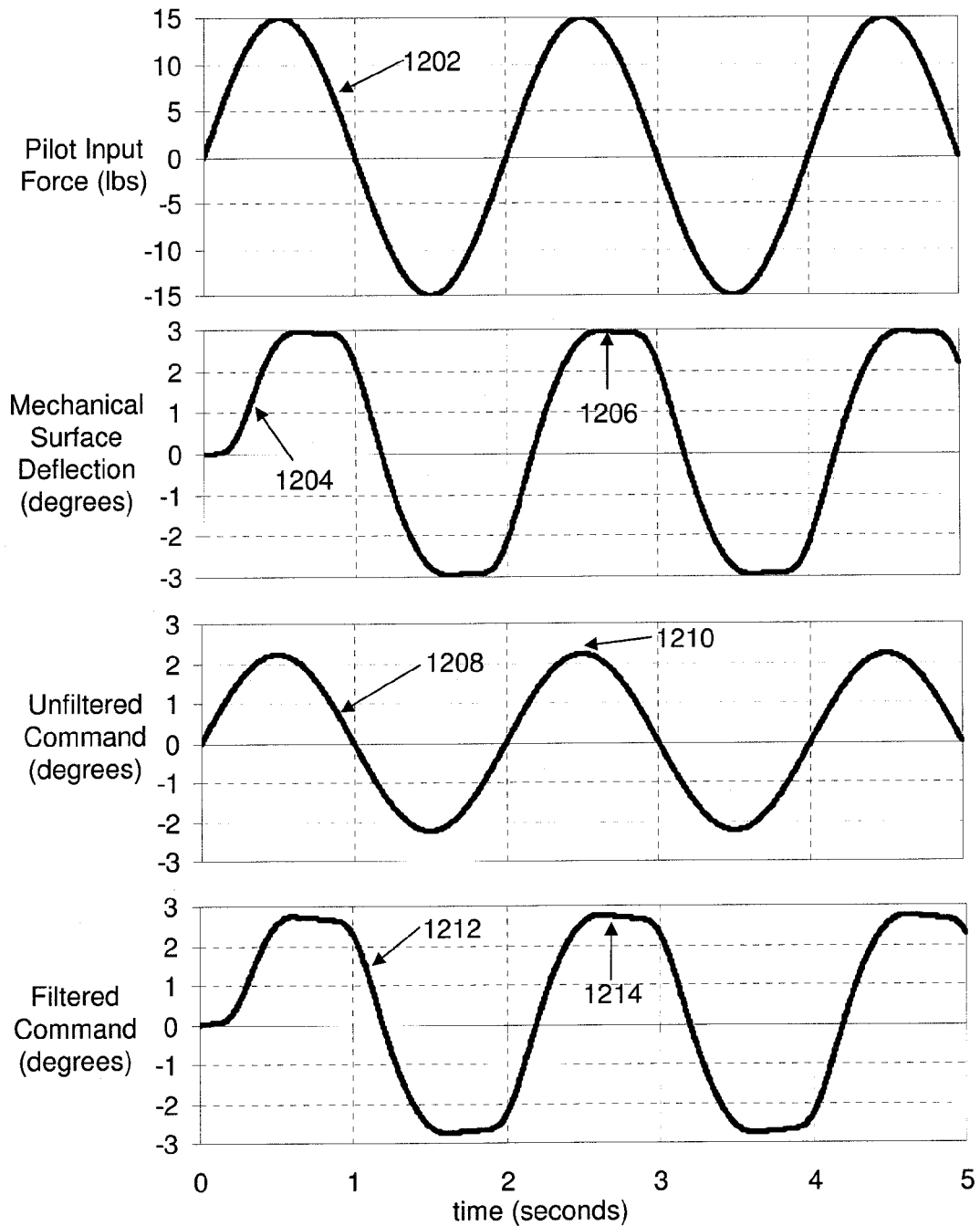
FIG. 12 is a time series diagram showing the position of various components in an embodiment of the system performing the process of the pilot force input command filter responding to certain pilot force input.

Referring now to FIG. 12, a force input signal is depicted by line 1202 including a relatively long wave oscillation with force maxima of approximately 15 lbs. The deflection of the mechanical control surfaces depicted by 1204 also displays a similar oscillation to the input force 1202, however the oscillation of mechanical deflection 1204 differs from the input oscillation in two respects.

First, the oscillation of the mechanical deflection 1204 lags the input oscillation 1202. In the embodiment of the force input command filter shown in FIG. 12, the mechanical deflection 1204 is shifted in phase by approximately 45 degrees from the input signal received from the pilot. The amplitude of phase shift may vary based on the details of the control system and its mechanical components and the frequency of the force input.

Second, the amplitude of the oscillation of the mechanical deflection 1204 is clipped, or flattened, at the maxima and minima. One such flattened maxima is depicted at 1206. This flattening is a result of friction in the mechanical components of the system, and its components varies based on the characteristics of each mechanical control system. The actual wave form is not limiting of the pilot force input command filter, but is simply to depict that the filter will compensate for the differing characteristics of various control systems.

The deflection of the powered control surfaces as it would be directed by the unfiltered command signal is depicted by line 1208. This deflection does not exhibit the lagging phase shift of the mechanical deflection 1204, nor is it clipped at the maxima 1210 as the mechanical deflection. Powered control surfaces governed by this signal would exhibit deflections that varied from the mechanical systems in an undesirable manner.

The filtered command signal is depicted by line 1212 in FIG. 12. The characteristics of the mechanical control system, as modeled by the filter described herein, generate a filtered command signal 1212 that exhibits the phase shift exhibited by the mechanical control surface, and the clipping of the maxima 1214 of the signal. The filtered command signal 1212 provides a deflection of the powered control surfaces that closely matches the mechanical surface deflection 1204, while the unfiltered command signal 1208 exhibits significant differences from mechanical deflection 1204.

Figure 13:
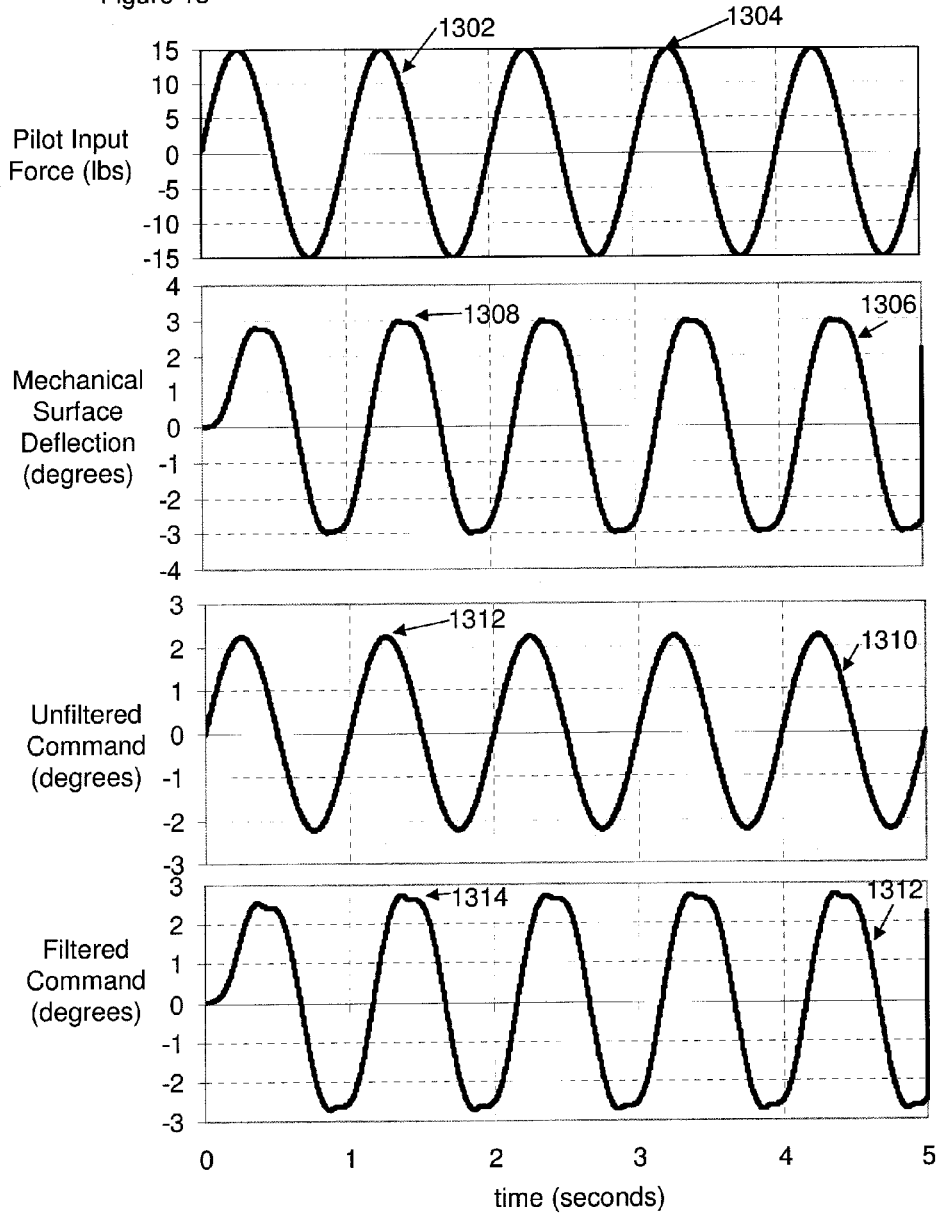
FIG. 13 is a time series diagram showing the position of various components in an embodiment of the system performing the process of the pilot force input command filter responding to certain pilot force input.

Referring now to FIG. 13, a pilot input force signal is depicted in line 1302 that displays a higher frequency periodic input as compared to the input in FIG. 12. The mechanical surface deflection of the unpowered control surface resulting from pilot input 1302 is depicted by line 1306. Similar to the unpowered surface deflection shown in FIG. 12, line 1306 exhibits a phase shift representing a lag in the time of the input force and the movement of the control surface, and a clipping and deformation of the signal at the maxima 1308 of the deflection. Also similarly to FIG. 12, the unfiltered command signal 1310 does not exhibit the phase shift or the deformation of maxima 1312. Filtered command signal 1312 as depicted in FIG. 13 does exhibit both the phase shift and the deformation of the control signal at maxima 1314. The filtered command signal 1312 is significantly more similar to the mechanical unpowered surface deflection 1306.

Figure 14:
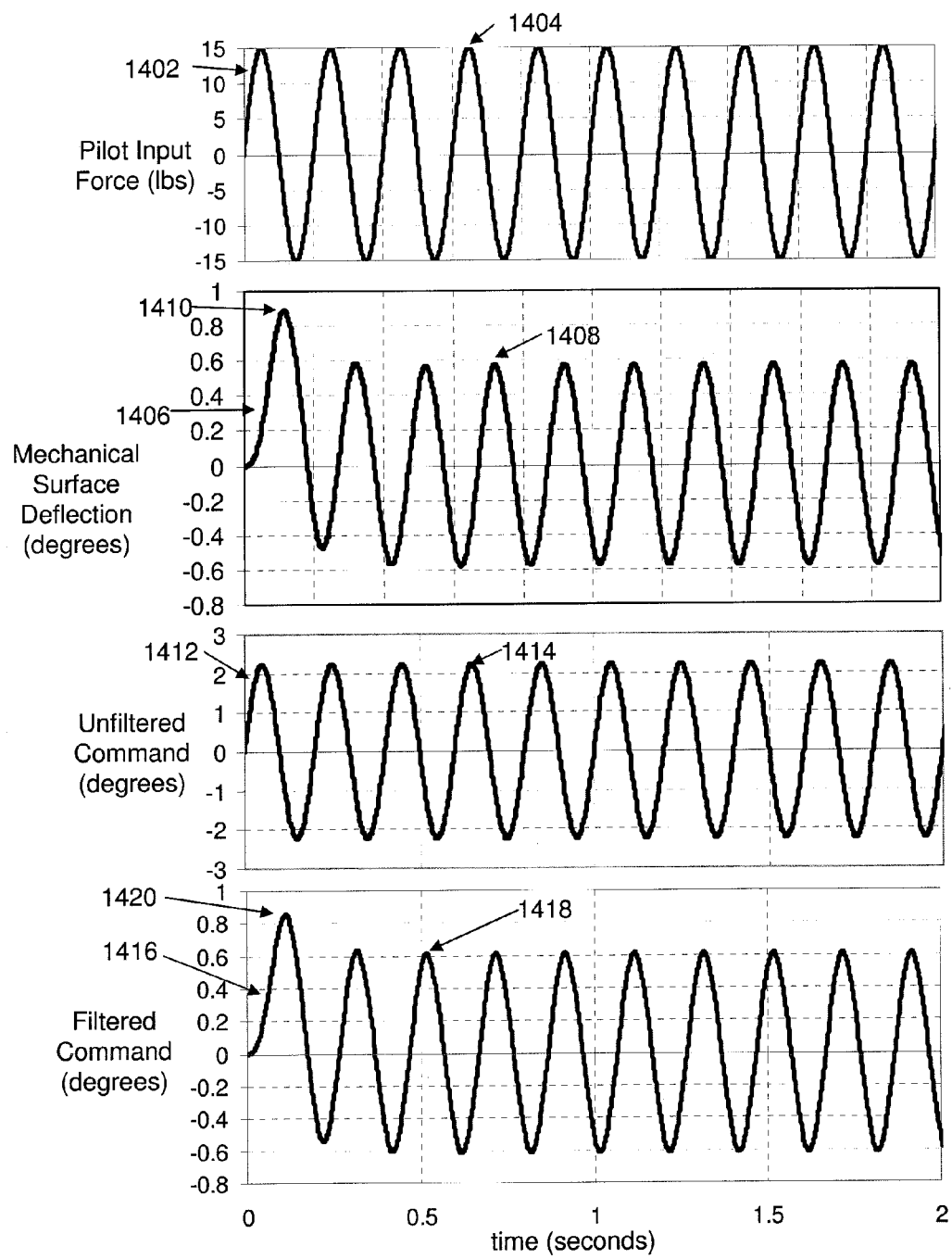
FIG. 14 is a time series diagram showing the position of various components in an embodiment of the system performing the process of the pilot force input command filter responding to certain pilot force input.

Referring now to FIG. 14, a higher frequency pilot input force signal 1402 is depicted with maxima 1404. The mechanical unpowered surface deflection 1406 displays the phase shift of other periodic inputs, but also exhibits an initial maxima 1410 that is higher than the steady state maxima 1408. The reduced steady state maxima 1408 represents the inability of the mechanical control systems to reach the maxima that would otherwise be dictated by the input signal 1402 as a result of the frequency of the periodic signal and the damping effects of the mechanical control system. The maximum deflection reached by the mechanical control surface is approximately 0.6 degrees at the steady state maxima 1408.

Unfiltered command 1412 does not exhibit the phase shift lag in the signal or the damping effects exhibited by the mechanical unpowered control system. Each maxima 1414 directs more than 2 degrees of deflection. The deflection thus produced is more than three times larger than the deflection produced in the unpowered control surfaces.

Filtered command signal 1416 exhibits both the phase shift and the damping evident in the mechanical surface deflection 1406. The steady state maxima 1418 is approximately 0.6 degrees, similar to the unpowered control surface deflection.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A process for positioning the powered control surfaces of an aircraft having both powered and unpowered control surfaces comprising the steps of:
   measuring a force signal received from the pilot of the aircraft in response to the aerodynamic forces on the unpowered control surfaces;
   converting the force signal into a torque signal;
   applying a filter to the torque signal to calculate a control signal;
   providing the control signal to the aircraft for positioning the powered control surfaces of the aircraft;
   wherein the step of applying a filter to the torque signal further comprises the steps of:
   converting the torque signal into an angular acceleration value;
   converting the angular acceleration value into an angular velocity value;
   calculating a frictional torque value for the angular velocity;
   calculating a damping torque value for the angular velocity;
   converting the angular velocity value into an angular position value;
   calculating a stiffness torque for the angular position value;
   calculating a control signal for the powered control surfaces from the angular position value;
   subtracting the frictional torque value, the damping torque value, and the stiffness torque value from the torque signal.

2. The process of claim 1 wherein the step of applying a filter to the torque signal further comprises the steps of:
   calculating a frictional torque value for the torque signal;
   converting the torque signal into an angular acceleration value;
   converting the angular acceleration value into an angular velocity value;
   calculating a damping torque value for the angular velocity;
   converting the angular velocity value into an angular position value;
   calculating a stiffness torque for the angular position value;
   calculating a control signal for the powered control surfaces from the angular position value;
   subtracting the frictional torque value, the damping torque value, and the stiffness torque value from the torque signal.

3. The process of claim 1 wherein the step of converting the torque signal into an angular acceleration value comprises integrating the torque signal over a period of time and the step of converting the angular acceleration value into an angular velocity value comprises integrating the angular acceleration value over a period of time.

4. The process of claim 3 wherein the step of calculating a frictional torque value for the angular velocity value comprises applying a frictional deadband model to the angular velocity value.

5. The process of claim 3 wherein the step of calculating a damping torque value for the angular velocity value comprises multiplying the angular velocity value by a damping coefficient value selected from a schedule of values measured in wind tunnel and test flights.

6. The process of claim 3 wherein the step of converting the angular velocity value into an angular position value comprises integrating the angular velocity value over a period of time.

7. The process of claim 3 wherein the step of calculating a stiffness torque for the angular position value further comprises selecting a hinge moment as a function of the angular position value from a schedule of values measured in wind tunnel and test flights.

8. The process of claim 1 wherein the step of providing the control signal to the aircraft further comprises the steps of:
   applying a gain factor to the angular position value to calculate a powered surface angular position estimated value;
   applying a lag compensator to the powered surface angular position estimated value to calculate a control signal.

9. The process of claim 8 wherein the step of calculating a stiffness torque for the angular position value further comprises the step of selecting a hinge moment as a function of the angular position value and of the powered surface angular position estimated value from a schedule of values measured in wind tunnel and test flights.

10. The process of claim 8 further comprising the steps of:
   measuring the actual angular position of the unpowered control surfaces;
   subtracting the angular position value from the actual angular position to calculate a position difference value;
   multiplying the position difference value by a time constant to produce an adjusted position difference value;
   subtracting the adjusted position difference value from the torque signal.

11. The process of claim 1 wherein the aircraft has a control means for inputting a force signal, and the step of converting the force signal into a torque value comprises multiplying the force signal by the moment of inertia of the control means.

* * * * *